(12) United States Patent
Kanaoka et al.

(10) Patent No.: US 10,958,880 B2
(45) Date of Patent: Mar. 23, 2021

(54) LUGGAGE MANAGEMENT SYSTEM AND LUGGAGE MANAGEMENT METHOD

(71) Applicant: TOYOTA JIDOSHA KABUSHIKI KAISHA, Toyota (JP)

(72) Inventors: Kei Kanaoka, Nagoya (JP); Shun Maeda, Nisshin (JP); Yoshihiro Murozaki, Nisshin (JP); Hiroko Tsujimura, Nagoya (JP); Daiki Kaneichi, Nisshin (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/793,490

(22) Filed: Feb. 18, 2020

(65) Prior Publication Data

US 2020/0186758 A1    Jun. 11, 2020

Related U.S. Application Data

(63) Continuation of application No. 16/214,534, filed on Dec. 10, 2018, now Pat. No. 10,609,347.

(30) Foreign Application Priority Data

Dec. 12, 2017   (JP) .............................. JP2017-237975

(51) Int. Cl.
*H04N 7/18* (2006.01)
*G06K 9/00* (2006.01)
(Continued)

(52) U.S. Cl.
CPC ............ *H04N 7/188* (2013.01); *B60R 25/01* (2013.01); *B60R 25/102* (2013.01); *B60R 25/24* (2013.01);
(Continued)

(58) Field of Classification Search
None
See application file for complete search history.

(56) References Cited

U.S. PATENT DOCUMENTS 10,609,347 B2 * 3/2020 Kanaoka ............ G07C 9/00896
2013/0033381 A1 * 2/2013 Breed ........................ B60T 7/16
340/568.1
(Continued)

FOREIGN PATENT DOCUMENTS

CN      107430719 A    12/2017
JP        6-30834 A     2/1994
(Continued)

*Primary Examiner* — Eileen M Adams
(74) *Attorney, Agent, or Firm* — Oblon, McClelland, Maier & Neustadt, L.L.P.

(57) ABSTRACT

A luggage management system includes: a locking/unlocking device mounted in a vehicle and configured to lock and unlock the vehicle in response to a request from a terminal, the terminal being used by a user who delivers luggage; an imaging device configured to capture an image of an inside of a predetermined area located in the vehicle, the predetermined area being used as a delivery place of the luggage; a control device configured to cause the imaging device to capture the image in the predetermined area when the locking/unlocking device locks or unlocks the vehicle in response to the request, and store the image; and a determination unit configured to determine, based on a result of comparison between a reference image and a comparison image, whether the luggage has been carried away from the predetermined area.

8 Claims, 19 Drawing Sheets

(51) Int. Cl.

| | |
|---|---|
| *G06K 9/62* | (2006.01) |
| *B60R 25/102* | (2013.01) |
| *B60R 25/24* | (2013.01) |
| *B60R 25/30* | (2013.01) |
| *G08B 13/14* | (2006.01) |
| *G07C 9/00* | (2020.01) |
| *B60R 25/01* | (2013.01) |

(52) U.S. Cl.
CPC .......... *B60R 25/302* (2013.01); *B60R 25/305* (2013.01); *G06K 9/00832* (2013.01); *G06K 9/6202* (2013.01); *G07C 9/00896* (2013.01); *G08B 13/14* (2013.01); *H04N 7/183* (2013.01); *G07C 2009/0092* (2013.01)

(56) References Cited

U.S. PATENT DOCUMENTS

2017/0190287 A1* 7/2017 Gjoni .................. G08B 21/24
2018/0111699 A1* 4/2018 Imseeh ................. G06F 16/51

FOREIGN PATENT DOCUMENTS

| JP | 2001-289705 A | 10/2001 |
|---|---|---|
| JP | 2005-312779 A | 11/2005 |
| JP | 2006-206225 | 8/2006 |
| JP | 2014-145200 A | 8/2014 |
| JP | 2017-517462 A | 6/2017 |
| JP | 2017-120535 A | 7/2017 |
| KR | 10-2016-0094597 A | 8/2016 |
| RU | 2 577 875 C1 | 3/2016 |

\* cited by examiner

FIG. 3
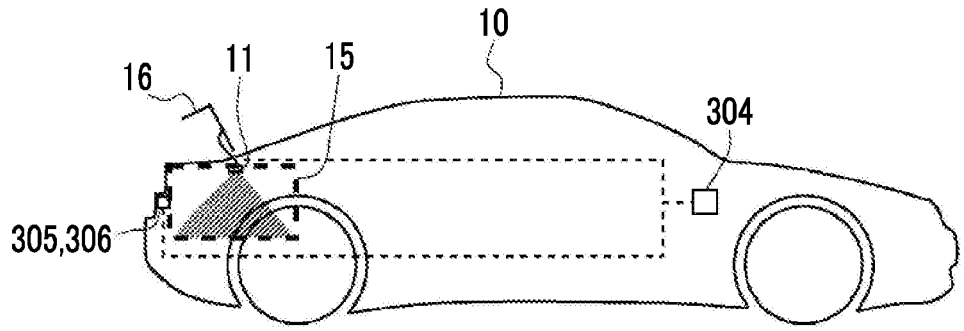
FIG. 4
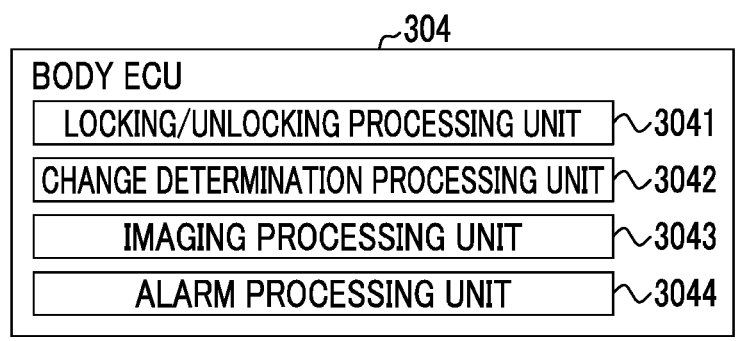
FIG. 5
| REQUEST USER ID | DELIVERY DATE AND TIME | DELIVERY PLACE | DELIVERY STATUS | LUGGAGE ATTRIBUTE |
|---|---|---|---|---|
| S001 | 01/11/2017 | VEHICLE | COMPLETED | ... |
| S001 | 02/11/2017 | VEHICLE | COMPLETED | ... |
| S001 | 03/11/2017 | VEHICLE | NOT COMPLETED | ... |
FIG. 6
| REQUEST USER ID | VEHICLE MODEL | COLOR | NUMBER | VEHICLE POSITION |
|---|---|---|---|---|
| S001 | ... | WHITE | XXYY | ... |

LUGGAGE MANAGEMENT SYSTEM AND LUGGAGE MANAGEMENT METHOD

INCORPORATION BY REFERENCE

This application is a continuation of U.S. patent application Ser. No. 16/214,534 filed Dec. 10, 2018, which claims the benefit of Japanese Priority Patent Application No. 2017-237975 filed on Dec. 12, 2017, the entire contents of which are incorporated herein by reference.

BACKGROUND

1. Technical Field

The disclosure relates to a luggage management system and a luggage management method.

2. Description of Related Art

Recently, a delivery system in which a cargo compartment of a vehicle which is designated by a user is used as a pickup and delivery place of luggage has been developed as means for efficiently performing pickup and delivery of luggage between a user of a delivery service and a deliverer. For example, Japanese Unexamined Patent Application Publication No. 2006-206225 (JP 2006-206225 A) has proposed a system that performs an authentication process between a delivery user terminal of a deliverer and a vehicle communication device mounted in a designated vehicle when the deliverer delivers luggage, and permits locking and unlocking of the designated vehicle when the authentication has succeeded.

SUMMARY

In such a delivery system, when delivery of luggage is performed by a plurality of deliverers with time differences therebetween, a later deliverer may accommodate luggage in a cargo compartment in a state in which luggage is already accommodated in the cargo compartment. In this case, there is concern that the deliverer may carry away the existing luggage. At this time, it is conceivable that the deliverer may not accommodate luggage in the cargo compartment and carry away luggage therein when opening and closing a door of the cargo compartment.

The disclosure provides a technique capable of contributing to improvement in security when a cargo compartment of a vehicle is used as a pickup and delivery place of luggage.

A first aspect of the disclosure provides a luggage management system including: a locking/unlocking device mounted in a vehicle and configured to lock and unlock the vehicle in response to a request from a terminal, the terminal being used by a user who delivers luggage; an imaging device configured to capture an image of an inside of a predetermined area located in the vehicle, the predetermined area being used as a delivery place of the luggage; a control device configured to cause the imaging device to capture the image of the inside of the predetermined area when the locking/unlocking device locks or unlocks the vehicle in response to the request, and store the image; and a determination unit configured to determine, based on a result of comparison between a reference image representing the inside of the predetermined area and a comparison image representing the inside of the predetermined area when the vehicle is locked, whether the luggage has been carried away from the predetermined area.

A user can access a predetermined area by unlocking a vehicle using a locking/unlocking device, and a user cannot access the predetermined area when the vehicle is locked using the locking/unlocking device. Before and after a delivery user accommodates luggage in the predetermined area, a state in the predetermined area changes and this change can be detected by the imaging device. Accordingly, according to this configuration, it is possible to determine whether luggage has been accommodated in the predetermined area or whether luggage has been carried out from the predetermined area based on an image captured by the imaging device.

For example, when an increase in the amount of luggage in the predetermined area can be determined from the image, it can be determined that luggage has been accommodated in the predetermined area. When a decrease in the amount of luggage in the predetermined area can be determined from the image, it can be determined that luggage has been carried away from the predetermined area. When it can be determined from the image that there is no change in the predetermined area, luggage has not been newly accommodated in the predetermined area and thus it can be determined that luggage to be delivered has been carried away. When the imaging device can identify luggage based on features (color or size) of an image, replacement of luggage or the like can be determined.

Here, carrying-way of luggage can occur in a period in which a delivery user can access the predetermined area. Accordingly, the control unit causes the imaging device to image the inside of the predetermined area at a time at which it can be determined that the state in the predetermined area has changed or has not changed until the vehicle has been locked after the vehicle has been unlocked. The operation of causing the imaging device to capture an image at that time, which is performed by the control unit, corresponds to an operation of causing the imaging device to image the inside of the predetermined area at the times of locking/unlocking of the vehicle with the locking/unlocking device. When the control unit stores an image captured in this way, it can be determined whether luggage has been carried away based on the stored image and thus it is possible to contribute to improvement in security.

In the first aspect, the control device may be configured to acquire the comparison image by causing the imaging device to capture a first image of the inside of the predetermined area at a locking-associated time, the locking-associated time being associated with a time at which the vehicle is locked.

In the first aspect, the control device may be configured to acquire the reference image by determining the comparison image as the reference image after the determination unit determines whether the luggage has been carried away from the predetermined area.

The locking-associated time is also a time at which a state associated with the state in the predetermined area when the vehicle has been locked can be imaged. This is also a time after the delivery user has accommodated luggage in the predetermined area or after the delivery user has carried away luggage from the predetermined area. When the vehicle has been locked, a delivery user cannot access the predetermined area and the state in the predetermined area cannot be changed by the delivery user. Accordingly, according to this configuration, it is possible to store an image indicating the state in the predetermined area after a delivery user has accessed the predetermined area.

In the first aspect, the control device may be configured to acquire the reference image by causing the imaging device to capture a second image of the inside of the predetermined area at an unlocking-associated time, the unlocking-associated time being associated with a time at which the vehicle is unlocked.

The unlocking-associated time is also a time at which a state associated with the state in the predetermined area when the vehicle has been unlocked can be imaged. This is also a time before a delivery user has accommodated luggage in the predetermined area or before the delivery user has carried away luggage from the predetermined area. Until the vehicle is unlocked after the vehicle has been locked, a delivery user cannot access the predetermined area and thus a delivery user cannot carry way luggage from the predetermined area in this period. On the other hand, when the vehicle has been unlocked, a delivery user can access the predetermined area and the state in the predetermined area can change. Accordingly, according to this configuration, it is possible to store an image indicating the state in the predetermined area at a time point at which a delivery user can access the predetermined area.

In the first aspect, the control device may be configured to cause the imaging device to capture a moving image from the unlocking-associated time to the locking-associated time.

According to this configuration, when and how luggage has been carried away can be stored as evidence. Since a still image can be extracted from a moving image, a still image at a next unlocking-associated time and a still image at a next locking-associated time can also be generated by capturing a moving image.

In the first aspect, the luggage management system may include a detection unit configured to detect opening and closing of the predetermined area, wherein the unlocking-associated time may be a time at which the detection unit detects that the predetermined area is opened.

The predetermined area can be opened and closed by unlocking the vehicle. Until the predetermined area is opened after the vehicle has been unlocked, a delivery user cannot access the predetermined area and thus the state in the predetermined area does not change. Accordingly, a captured image of the predetermined area when the predetermined area has been opened can be said to represent the inside of the predetermined area before the vehicle has been unlocked. According to this configuration, by setting a time point at which a delivery user can actually access the predetermined area as the unlocking-associated time, for example, an imaging time when a moving image is captured can be shortened and thus it is possible to decrease a memory capacity required for storing the moving image and to decrease power consumption of a battery.

In the first aspect, the luggage management system may include a detection unit configured to detect opening and closing of the predetermined area, wherein the locking-associated time may be a time at which the detection unit detects that the predetermined area is closed.

When the predetermined area is closed before the vehicle has been locked, a delivery user cannot access the predetermined area. Accordingly, a captured image of the predetermined area when the predetermined area has been closed can be said to represent the inside of the predetermined area after the vehicle has been locked. According to this configuration, by setting an end point at which a delivery user can actually access the predetermined area as the locking-associated time, for example, an imaging time when a moving image is captured can be shortened and thus it is possible to decrease a memory capacity for storing the moving image and to decrease power consumption of a battery.

In the first aspect, the unlocking-associated time may be a time at which the locking/unlocking device unlocks the vehicle in response to the request.

In the first aspect, the locking-associated time may be a time at which the locking/unlocking device locks the vehicle in response to the request.

A time at which the vehicle is locked and unlocked by the locking/unlocking device is controlled by the locking/unlocking device. Accordingly, according to this configuration, it is possible to set an unlocking-associated time and a locking-associated time without providing means for detecting opening and closing of the predetermined area.

In the first aspect, the determination unit may be configured to determine the second image as the reference image, the second image being captured by the imaging device at the unlocking-associated time and the first image as the comparison image, the first image being captured by the imaging device at the locking-associated time.

According to this configuration, it is possible to detect a difference between an image captured at the unlocking-associated time and an image captured at the locking-associated time through comparison therebetween and to determine that a delivery user has carried away luggage when the luggage appearing in the image captured at the unlocking-associated time is not present in the image captured at the locking-associated time. When luggage not appearing in the image captured at the unlocking-associated time is present in the image captured at the locking-associated time, it is possible to determine that a delivery user has accommodated the luggage. When there is no change between the image captured at the unlocking-associated time and the image captured at the locking-associated time, it is possible to determined that luggage to be delivered has not been delivered but carried away.

In the first aspect, the determination unit may be configured to determine a previous image as the reference image, the previous image being captured by the imaging device at a previous locking-associated time and a current image as the comparison image, the comparison image being captured by the imaging device at a current locking-associated time.

It is assumed that a delivery user cannot access the predetermined area in a time period from a previous locking-associated time to a current unlocking-associated time, and thus it can be assumed that there will be no change in the predetermined in the time period. According to this configuration, an image at a previous locking-associated time can be used as an image at a time corresponding to a current unlocking-associated time. By decreasing the number of times of acquisition of an image in this way, it is possible to simplify the system.

In the first aspect, the luggage management system may include a mass acquiring unit configured to acquire an acquired mass of the luggage to be delivered to the predetermined area before delivery of the luggage and a mass detecting unit configured to detect a detected mass of the luggage in the vehicle, wherein the determination unit may be configured to determine, based on a result of comparison between the acquired mass of the luggage and the detected mass of the luggage, whether the luggage has been carried away from the predetermined area.

When a plurality of pieces of luggage has been accommodated in the predetermined area, it is conceivable that a piece of luggage accommodated in an area hidden by another piece of luggage when seen from the imaging device will not appear in a captured image. It is also conceivable that a delivery user may accommodate only an outer case of luggage in the predetermined area and carries away contents thereof. Carrying-away of contents cannot be detected from a captured image. In this way, it may be difficult to determine whether luggage has been carried away based on only the captured image. On the other hand, it is conceivable that a mass of luggage may also be considered in determining whether luggage has been carried away. That is, when luggage has been accommodated in the predetermined area, the total mass of luggage in the predetermined area increases by the mass of the newly accommodated luggage. Accordingly, when luggage does not appear in an image but the mass in the predetermined area increases by the mass of luggage to be delivered, it is possible to determine that the luggage has been accommodated. On the other hand, when contents of luggage have been carried away and only the outer case thereof has been accommodated therein, the total mass of luggage in the predetermined area will not increase by the mass of the luggage to be delivered and thus it is possible to determine that the luggage has not been accommodated. Accordingly, according to this configuration, it is possible to prevent erroneous determination by determining whether luggage has been carried away in consideration of a mass of luggage in addition to an image in the predetermined area.

In the first aspect, the luggage management system may include a request user terminal, the request user terminal being used by a user who receives the luggage, and the request user terminal being configured to request the locking/unlocking device to lock and unlock the vehicle, wherein the determination unit may be configured to inquire of the request user terminal about whether the luggage has been taken out from the predetermined area when the request user terminal requests locking/unlocking of the vehicle, and reset the previous image, when the request user terminal returns a response indicating that the luggage has been taken out in response to an inquiry from the determination unit.

When a user who receives luggage (hereinafter also referred to as a request user) has carried away luggage from the predetermined area, a rightful user has carried away luggage and thus there is no problem. However, when a delivery user delivers luggage thereafter, the state in the predetermined area is different from a state based on an image captured by the imaging device at a previous locking-associated time and thus it is not preferable that this image be used to determine whether luggage has been carried away. Accordingly, when a request user terminal has returned a response indicating that luggage has been taken out, the control device resets the image captured at the previous locking-associated time such that the image is not used to determine whether luggage has been carried away. According to this configuration, it is possible to prevent erroneous determination by determining whether luggage has been carried away based on a newly stored image.

In the first aspect, the luggage management system may include a notification unit configured to perform a predetermined notification process when the determination unit determines that the luggage has been carried away from the predetermined area.

According to this configuration, since a user or the like having requested delivery of luggage can immediately ascertain carrying-away of luggage, it is possible to take measures corresponding thereto.

In the first aspect, the luggage management system may further include a notification unit configured to perform a predetermined notification process to a terminal other than the request user terminal when the determination unit determines that the luggage has been carried away from the predetermined area.

In the first aspect, the determination unit may be configured to inquire of a request user terminal, the request user terminal being used by a user who receives the luggage, and the request user terminal being configured to request the locking/unlocking device to lock and unlock the vehicle, about whether the luggage has been taken out from the predetermined area when the locking/unlocking device is requested by the request user terminal, and reset the previous image, when a response indicating that the luggage has been taken out is returned by the request user terminal.

A second aspect of the disclosure provides a luggage management method. The luggage management method includes: using a predetermined area located in a vehicle as a delivery place of luggage; locking and unlocking the vehicle in response to a request from a terminal, the terminal being used by a user who delivers the luggage;

causing an imaging device to capture an image of an inside of the predetermined area when the vehicle is locked and unlocked in response to the request; storing the captured image; and determining, based on a result of comparison between a reference image representing the inside of the predetermined area and a comparison image representing the inside of the predetermined area when the vehicle is locked, whether the luggage has been carried away from the predetermined area.

According to the disclosure, it is possible to contribute to improvement in security when a cargo compartment of a vehicle is used as a pickup and delivery place of luggage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram schematically illustrating arrangements of devices in a vehicle;

FIG. 4 is a block diagram schematically illustrating an example of a configuration of a body ECU;

FIG. 5 is a diagram illustrating a table structure of delivery information;

FIG. 6 is a diagram illustrating a table structure of vehicle management information;

DETAILED DESCRIPTION OF EMBODIMENTS

Hereinafter, specific embodiments of the disclosure will be described with reference to the accompanying drawings. Dimensions, materials, shapes, relative positions, and the like of constituent parts described in the following embodiments are not intended to limit the technical scope of the disclosure thereto unless this is particularly mentioned. The following embodiments can be combined.

First Embodiment

<System Outline>

Figure 1:
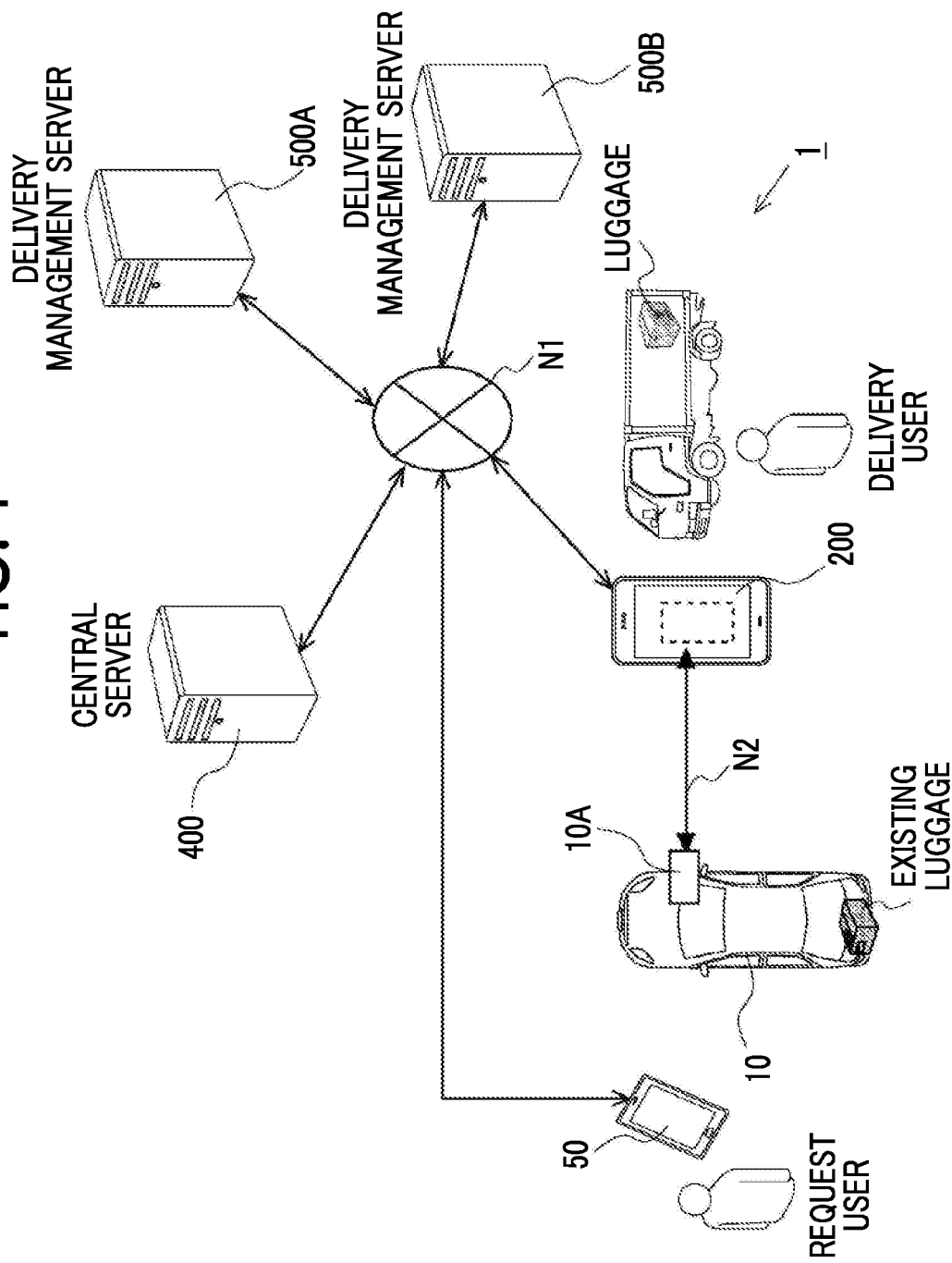
FIG. 1 is a diagram schematically illustrating a configuration of a luggage management system according to a first embodiment.

FIG. 1 is a diagram schematically illustrating a configuration of a luggage management system 1 according to a first embodiment. The luggage management system 1 is a system that manages luggage in a delivery service in which a cargo compartment (a trunk room) of a vehicle 10 is used as a pickup and delivery place of luggage by allowing a person who requests delivery of luggage and a person to whom the delivery of luggage is requested to commonly use (share) a cargo compartment of a vehicle 10 which is designated by a requester. Accordingly, a "person who requests delivery of luggage" and a "person to whom delivery of luggage is requested" are users who use the cargo compartment of the vehicle 10, and the former is referred to as a "request user" and the latter is referred to as a "pickup and delivery user" to distinguish both persons from each other. The cargo compartment is a predetermined area in the vehicle 10 which can accommodate luggage to be delivered and which is configured to be locked and unlocked by an onboard unit 10A as will be described later. The cargo compartment may be, for example, a trunk of a vehicle or a passenger compartment such as a passenger seat. The cargo compartment is an area which is partitioned from a passenger compartment in which a driver or the like of the vehicle 10 sits such that the cargo compartment and the passenger compartment cannot be accessed from each other.

In the example illustrated in FIG. 1, the luggage management system 1 includes an onboard unit 10A that is installed in a vehicle 10, a delivery user terminal 200, a request user terminal 50, a central server 400, and delivery management servers 500A and 500B. The onboard unit 10A, the delivery user terminal 200, the request user terminal 50, the central server 400, and the delivery management server 500A and 500B are connected to each other via a network N1. The network N1 may be, for example, a global public communication network such as the Internet, and a wide area network (WAN) or other communication networks may be employed. The network N1 may include a telephone communication network for mobile phones and the like and a wireless communication network such as WiFi. The onboard unit 10A is connected to the delivery user terminal 200 which is a terminal used by a delivery user via a network N2 including a short-range radio communication network or the like. For example, the luggage management system 1 includes two delivery management servers 500A and 500B, but may include three or more delivery management servers. When the delivery management servers are collectively mentioned in the following description, 500 is used as a reference sign thereof.

The delivery management server 500 receives registration of an article to be delivered (hereinafter also referred to as "luggage") from a request user terminal 50 which is a terminal used by a request user. For example, when an article purchased from a product purchase site opened by an electronic transaction provider is delivered as luggage to a request user, the request user can register delivery information of the luggage in the delivery management server 500 through an application for utilizing a service using the luggage management system 1 (hereinafter also referred to as a predetermined application) which is installed in a request user terminal 50. The delivery information includes identification information of the request user and delivery schedule information as illustrated in FIG. 5 which will be described later. In the delivery management server 500, the identification information of the request user is also correlated in advance with a vehicle 10 correlated with the request user, and a delivery place to be used is appropriately selected from candidates for the delivery place associated with the user (the request user) including the vehicle 10 and is included in the delivery information by the request user. In the following description, it is assumed that the delivery place of the request user is set to a vehicle 10. The delivery information further includes information on a status of luggage. An example of the status information is information on whether delivery of luggage has been completed or the like.

It is assumed that the delivery management server 500A and the delivery management server 500B illustrated in FIG.

1 are managed by different delivery companies. Accordingly, delivery of luggage based on the delivery information which is managed by the delivery management server 500A is performed by a delivery company other than a delivery company that performs delivery of luggage based on the delivery information which is managed by the delivery management server 500B. When delivery users belonging to the delivery companies that manage the delivery management servers 500A and 500B are distinguished from each other, it is assumed in the following description that a suffix is added thereto like a delivery user A and a delivery user B.

When a request for delivery of luggage is received from a request user terminal 50 and a delivery place thereof is a vehicle 10, the delivery management server 500 requests the central server 400 to transmit authentication information for locking/unlocking the vehicle 10 in which the luggage will be accommodated (also referred to as "locking/unlocking a cargo compartment of the vehicle 10 in which the luggage is accommodated") to a delivery user terminal 200. The request is transmitted with a request from the delivery user terminal 200 as a trigger. The central server 400 transmits authentication information for the vehicle 10 correlated with identification information of the request user to the delivery user terminal 200 via the delivery management server 500 based on the identification information of the request user included in the delivery information. The delivery user can access the cargo compartment of the vehicle 10 to deliver the luggage by locking/unlocking the cargo compartment of the vehicle 10 using the authentication information received by the delivery user terminal 200. Here, the authentication information is digital information which is used to allow an onboard unit 10A to perform a locking/unlocking process for the cargo compartment of the vehicle 10 by being transmitted from the delivery user terminal 200 to the onboard unit 10A by short-range radio communication and being subjected to an authentication process by the onboard unit 10A. The locking/unlocking process for the cargo compartment of the vehicle 10 is a process of locking/unlocking a door of the cargo compartment of the vehicle 10 in which luggage is accommodated through the onboard unit 10A of which details will be described later.

Figure 2:
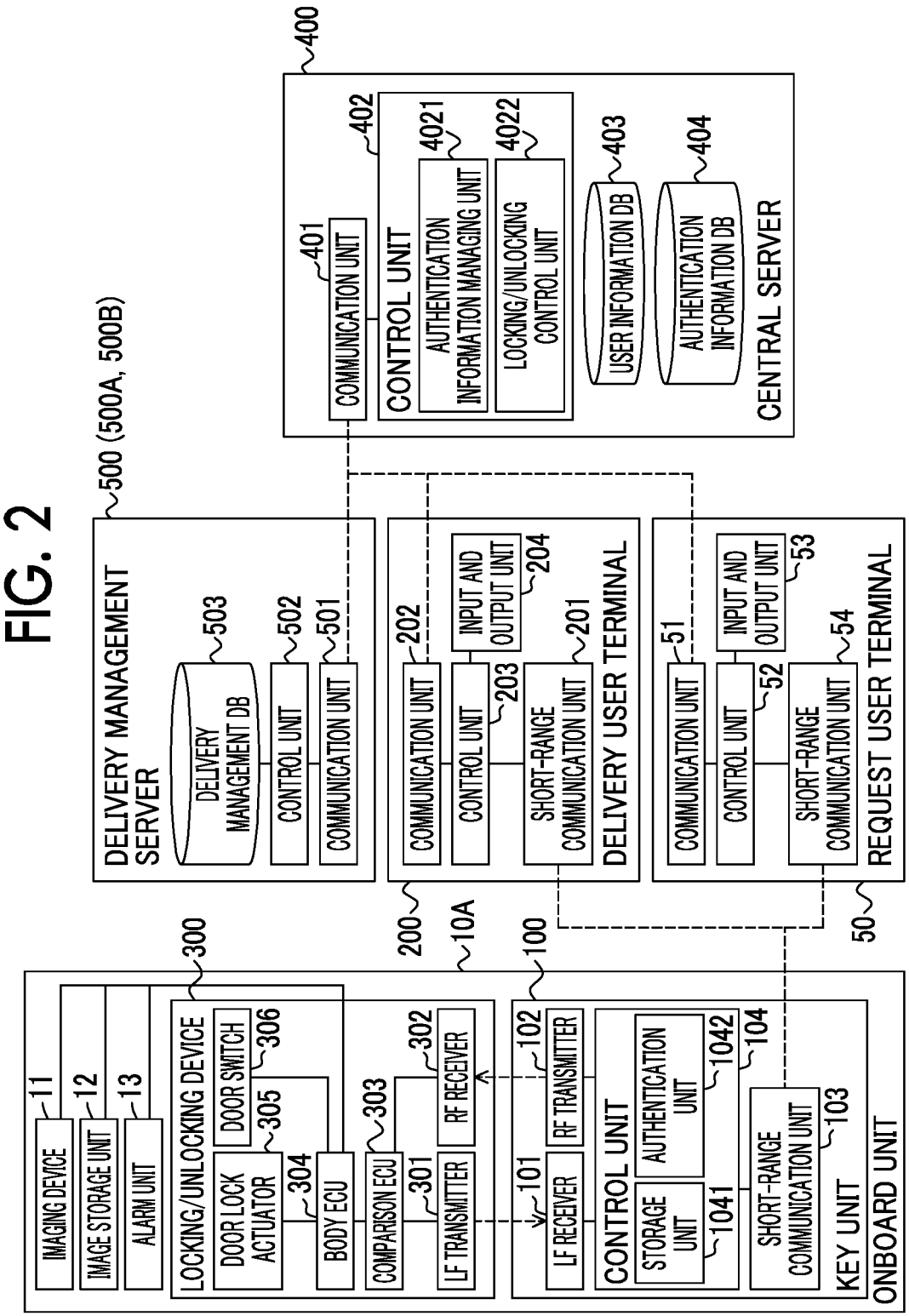
FIG. 2 is a block diagram schematically illustrating an example of a configuration of the luggage management system according to the first embodiment.

FIG. 2 is a block diagram schematically illustrating an example of configurations of an onboard unit 10A, a delivery user terminal 200, a request user terminal 50, a delivery management server 500, and a central server 400 which constitute the luggage management system 1. The hardware configurations and the functional configurations of the onboard unit 10A, the delivery user terminal 200, the request user terminal 50, the delivery management server 500, and the central server 400 will be described below with reference to FIG. 2.

The onboard unit 10A includes a key unit 100, a locking/unlocking device 300, an imaging device 11, an image storage unit 12, and a notification unit 13. The key unit 100 includes the same radio interface as an electronic key of a smart key (hereinafter referred to as a portable unit), and can perform locking and unlocking of a cargo compartment or a passenger compartment of a vehicle 10 (hereinafter may be simply referred to as "locking and unlocking of a vehicle 10" when the cargo compartment and the passenger compartment do not need to be distinguished) without using any physical key by communication with the locking/unlocking device 300 of the onboard unit 10A. The key unit 100 performs short-range radio communication with a mobile terminal such as a delivery user terminal 200 and determines whether it serves as an electronic key of the vehicle 10 based on the result of an authentication process for the delivery user terminal 200.

The delivery user terminal 200 receives authentication information for locking and unlocking the cargo compartment, which is issued by the central server 400, via the delivery management server 500 as described above when accessing the cargo compartment of the vehicle 10 for delivery of luggage. Then, the authentication information transmitted from the delivery user terminal 200 to the key unit 100 is compared with authentication information stored in advance in the key unit 100. When the authentication process has succeeded, the delivery user terminal 200 is authenticated as a terminal that rightly operates the onboard unit 10A. When the delivery user terminal 200 has been authenticated, the key unit 100 transmits a key ID of the vehicle 10, which is stored in advance in the key unit 100 and correlated with the authentication information, to the locking/unlocking device 300 along with a locking signal or an unlocking signal. In the following description, a locking signal and an unlocking signal are collectively referred to as a locking/unlocking signal. The term, locking/unlocking signal, represents at least one of a locking signal and an unlocking signal. The locking/unlocking device 300 locks or unlocks the vehicle 10 when the key ID received from the key unit 100 coincides with a key ID stored in advance in the locking/unlocking device 300. The key unit 100 and the locking/unlocking device 300 operate with electric power which is supplied from a battery mounted in the vehicle 10. The key ID stored in advance in the key unit 100 may be encrypted with authentication information. In this case, when the authentication process for the delivery user terminal 200 has succeeded, the key unit 100 can decrypt the key ID with the authentication information and transmit the decrypted key ID to the locking/unlocking device 300.

Details of the locking/unlocking device 300 will be described below. The locking/unlocking device 300 is a device that locks and unlocks a door of a passenger compartment or a cargo compartment of a vehicle 10. For example, the locking/unlocking device 300 locks and unlocks the door of the vehicle 10 in accordance with a locking signal and an unlocking signal which are transmitted from a portable unit corresponding to the vehicle 10 using radio waves of a radio frequency (hereinafter referred to as RF) band. The locking/unlocking device 300 also has a function of transmitting radio waves of a low frequency (hereinafter referred to as LF) band for detecting the portable unit.

In this embodiment, the key unit 100 instead of the mobile unit controls locking and unlocking of the door of the vehicle 10 by transmitting and receiving radio waves of an RF band and an LF band to and from the locking/unlocking device 300. In the following description, unless otherwise mentioned, the communication destination of the locking/unlocking device 300 is limited to the key unit 100.

The locking/unlocking device 300 includes an LF transmitter 301, an RF receiver 302, a comparison ECU 303, a body ECU 304, a door lock actuator 305, and a door switch 306. The LF transmitter 301 is means that transmits radio waves of an LF band (for example, 100 KHz to 300 KHz) for detecting (polling) the key unit 100. The LF transmitter 301 is incorporated, for example, into a center console or in the vicinity of a steering wheel in the passenger compartment. The RF receiver 302 is means that receives radio waves of an RF band (for example, 100 MHz to 1 GHz) transmitted from the key unit 100. The RF receiver 302 is incorporated at any position in the passenger compartment.

The comparison ECU 303 is a computer that performs control for locking and unlocking the door of the passenger compartment or the cargo compartment of the vehicle 10 based on a signal (a locking signal or an unlocking signal) transmitted from the key unit 100 using radio waves of an RF band. The comparison ECU 303 is constituted, for example, by a microcomputer.

The comparison ECU 303 authenticates whether the locking/unlocking signal transmitted from the key unit 100 has been transmitted from a rightful device. Specifically, the comparison ECU 303 determines whether the key ID included in the locking/unlocking signal coincides with the key ID stored in advance in a storage unit (not illustrated) of the comparison ECU 303. Then, the comparison ECU 303 transmits an unlocking command or a locking command to the body ECU 304 based on the determination result. The unlocking command or the locking command is transmitted via an onboard network such as a controller area network (CAN).

FIG. 3 is a diagram schematically illustrating arrangements of the devices in the vehicle 10. The door lock actuator 305 is an actuator that locks and unlocks the door of the vehicle 10 (such as a passenger compartment door which is opened and closed at the time of getting in and out of the passenger compartment as a boarding space or a cargo compartment door 16 which is opened and closed at the time of loading luggage in the cargo compartment 15). The door lock actuator 305 operates based on a signal transmitted from the body ECU 304. The door lock actuator 305 may be configured to independently lock and unlock the passenger compartment door and the cargo compartment door 16 of the vehicle 10. The door lock actuator 305 that locks and unlocks the cargo compartment door 16 is illustrated in FIG. 3. A hatched area in FIG. 3 is an area which is imaged by the imaging device 11.

The door switch 306 is a switch that is switched to ON when the door of the vehicle 10 is opened and is switched to OFF when the door of the vehicle 10 is closed. In FIG. 3, the door switch 306 that detects opening and closing of the cargo compartment door 16 is illustrated. An ON/OFF signal of the door switch 306 is input to the body ECU 304. The door switch 306 may serve as a "detection unit" in the claims.

The body ECU 304 is a computer that executes body control of the vehicle 10. FIG. 4 is a block diagram schematically illustrating an example of a configuration of the body ECU 304. The body ECU 304 includes a locking/unlocking processing unit 3041, a change determination processing unit 3042, an imaging processing unit 3043, and an alarm processing unit 3044. The locking/unlocking processing unit 3041 has a function of simultaneously or independently performing unlocking and locking of the passenger compartment door or the cargo compartment door 16 of the vehicle 10 by controlling the door lock actuator 305 based on the unlocking command or the locking command received from the comparison ECU 303. The comparison ECU 303 and the body ECU 304 may be embodied as a single body. The change determination processing unit 3042, the imaging processing unit 3043, and the alarm processing unit 3044 will be described later.

The key unit 100 will be described now. The key unit 100 is a device that is disposed at a predetermined position (for example, inside a glove box) in the passenger compartment of the vehicle 10. The key unit 100 has a function of authenticating a delivery user terminal 200 by performing short-range radio communication with the delivery user terminal 200 or the like and a function of transmitting a locking/unlocking signal using radio waves of an RF band based on the authentication result. The key unit 100 includes an LF receiver 101, an RF transmitter 102, a short-range communication unit 103, and a control unit 104.

The LF receiver 101 is means that receives a polling signal transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the locking/unlocking device 300 using radio waves of an RF band.

The short-range communication unit 103 is means that communicates with a delivery user terminal 200. The short-range communication unit 103 performs communication in a short range (at a distance at which communication can be performed between the interior and the exterior of the vehicle) using a predetermined radio communication standard. In this embodiment, the short-range communication unit 103 performs data communication based on a Bluetooth (registered trademark) Low Energy standard (hereinafter referred to as BLE). BLE is a low-energy communication standard using Bluetooth, and is characterized in that communication can be started immediately when a communication partner has been detected without requiring pairing between devices. In this embodiment, BLE is exemplified, but another radio communication standard can also be used. For example, near field communication (NFC), ultra wideband (UWB), or WiFi (registered trademark) may be used.

The control unit 104 is a computer that performs short-range radio communication with a delivery user terminal 200 via the short-range communication unit 103 and performs control for authenticating the delivery user terminal 200 and control for transmitting a locking/unlocking signal based on the authentication result. The control unit 104 is constituted, for example, by a microcomputer.

The control unit 104 includes a storage unit 1041 and an authentication unit 1042. A control program for controlling the key unit 100 is stored in the storage unit 1041. The control unit 104 may realize various functional units including the authentication unit 1042 by causing a CPU which is not illustrated to execute the control program stored in the storage unit 1041. For example, the control unit 104 may realize a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the delivery user terminal 200 which is performed by the short-range communication unit 103, and a function of generating a locking/unlocking signal when authentication of the delivery user terminal 200 by the authentication unit 1042 has succeeded.

The authentication unit 1042 authenticates the delivery user terminal 200 based on authentication information included in a locking request or an unlocking request (hereinafter collectively referred to as a locking/unlocking request) transmitted from the delivery user terminal 200. Specifically, the authentication unit 1042 compares the authentication information transmitted from the delivery user terminal 200 with the authentication information stored in the storage unit 1041 and determines that the authentication has succeeded when they satisfy a predetermined relationship. When the two pieces of authentication information do not satisfy the predetermined relationship, the authentication unit 1042 determines that authentication has failed.

Here, the predetermined relationship includes a case in which the authentication information stored in the storage unit 1041 coincides with the authentication information transmitted from the delivery user terminal 200, a case in which results of predetermined processes such as encryption and decryption using the two pieces of authentication information coincide with each other, and a case in which a result of decryption on one of the two pieces of authentication information coincides with that on the other thereof.

When the authentication of the delivery user terminal 200 by the authentication unit 1042 has succeeded, a locking/unlocking signal generated in response to a request received from the delivery user terminal 200 is transmitted to the locking/unlocking device 300 via the RF transmitter 102. In the following description, the authentication information stored in the key unit 100 is referred to as device authentication information and the authentication information transmitted from the delivery user terminal 200 is referred to as terminal authentication information, if necessary.

The key unit 100 transmits the key ID along with the locking/unlocking signal to the locking/unlocking device 300. The key ID may be stored in the key unit 100 in a plaintext state in advance or may be stored in a state in which it is encrypted using a cipher specific to the delivery user terminal 200. When the key ID is stored in the encrypted state, the encrypted key ID may be decrypted using the authentication information transmitted from the delivery user terminal 200 to acquire the original key ID.

Then, the imaging device 11 is disposed in the cargo compartment 15 of the vehicle 10 and captures an image in the cargo compartment 15. The imaging device 11 is, for example, a camera that captures an image using an imaging element such as a charge coupled device (CCD) image sensor or a complementary metal oxide semiconductor (CMOS) image sensor. An image acquired by the imaging may be any of a still image and a moving image, and it is assumed in this embodiment that the imaging device 11 captures a moving image. Similarly to the key unit 100 and the locking/unlocking device 300, the imaging device 11 operates with electric power which is supplied from a battery mounted in the vehicle 10.

The image storage unit 12 stores image data such as moving image data captured by the imaging device 11 or still image data extracted from the moving image using an erasable programmable ROM (EPROM), a hard disk drive (HDD), a removable medium, or the like. The removable medium is, for example, a universal serial bus (USB) memory or a disc recording medium such as a compact disc (CD) or a digital versatile disc (DVD). The notification unit 13 performs a predetermined notification process based on process results in a change determining process which will be described later. The predetermined notification process will be described later.

In this way, the onboard unit 10A performs a sequence of processes of performing the authentication process using the key unit 100, operating the locking/unlocking device 300, and locking or unlocking the passenger compartment or the cargo compartment of the vehicle 10 with the authentication information transmitted from the delivery user terminal 200 as a trigger.

The delivery user terminal 200 will be described now. The delivery user terminal 200 is a small portable computer such as a smartphone, a mobile phone, a tablet terminal, a personal information terminal, or a wearable computer (such as a smart watch). The delivery user terminal 200 may be a personal computer (PC) that is connected to the delivery management server 500 via the network N1 such as the Internet which is a public communication network. The delivery user terminal 200 includes a short-range communication unit 201, a communication unit 202, a control unit 203, and an input and output unit 204.

The short-range communication unit 201 is means that performs communication with the key unit 100 using the same radio communication standard as the short-range communication unit 103 of the key unit 100. A network which is set up between the short-range communication unit 201 and the key unit 100 is illustrated as N2 in FIG. 1. The communication unit 202 is communication means that connects the delivery user terminal 200 to the network N1. In this embodiment, the communication unit 202 can communicate with another device (for example, the delivery management server 500) via the network N1 using a mobile communication service such as 3G ($3^{rd}$ Generation) or LTE (Long Term Evolution).

The control unit 203 is a computer that takes charge of control of the delivery user terminal 200. The control unit 203 performs, for example, a process of acquiring the terminal authentication information, a process of generating a locking/unlocking request including the acquired terminal authentication information, a process of transmitting the generated locking/unlocking request to the key unit 100, and the like. The control unit 203 is constituted, for example, by a microcomputer, and the functions of performing the above-mentioned processes are realized by causing a CPU (not illustrated) to execute a program stored in storage means (such as a ROM) (not illustrated).

The control unit 203 performs an interaction with a delivery user via the input and output unit 204. The input and output unit 204 is means that receives an input operation which has been performed by the delivery user and presents information to the delivery user. Specifically, the input and output unit 204 includes a touch panel and control means thereof and a liquid crystal display and control means thereof. The touch panel and the liquid crystal display are constituted as a single touch panel display in this embodiment.

The control unit 203 displays an operation screen on the input and output unit 204 and generates a locking/unlocking request based on an operation which has been performed by the delivery user. For example, the control unit 203 outputs an icon for unlocking, an icon for locking, and the like to the touch panel display and generates an unlocking request or a locking request based on the operation which has been performed by the delivery user. The operation which is performed by the delivery user is not limited to an operation using the touch panel display. For example, the operation may be performed using a hardware switch.

The control unit 203 performs a process of acquiring terminal authentication information from the central server 400. The terminal authentication information is not information (a key ID) which is used for the locking/unlocking device 300 to authenticate the key unit 100, but is information which is used for the key unit 100 to authenticate the delivery user terminal 200 (for example, authentication information corresponding to authentication information specific to the key unit 100 mounted in the vehicle 10). Specifically, the control unit 203 transmits a request for issuance of terminal authentication information to the central server 400 via the delivery management server 500 using the communication unit 202. The "request for issuance of terminal authentication information" mentioned herein includes identification information of the delivery user terminal 200 and a signal for requesting issuance of terminal authentication information specific to the key unit 100. The central server 400 having received the request for issuance of terminal authentication information acquires the terminal authentication information specific to the key unit 100 mounted in the vehicle 10 and transmits the acquired terminal authentication information to the delivery user terminal 200. Accordingly, the delivery user terminal 200 can perform an operation of unlocking the vehicle 10. When the delivery user terminal 200 does not store the terminal authentication information, a locking operation and an unlocking operation on the operation screen are not possible.

In this embodiment, the terminal authentication information acquired by the delivery user terminal 200 may be a one-time key which is invalidated with locking of the cargo compartment door 16 due to ending of a delivery operation by a delivery user as a trigger. For example, at a time at which the terminal authentication information transmitted from the central server 400 is received by the delivery user terminal 200, the terminal authentication information may be stored in a storage unit (not illustrated) of the delivery user terminal 200. Thereafter, for example, at a time at which an unlocking notification transmitted from the key unit 100 is received by the delivery user terminal 200 when locking of the cargo compartment door 16 due to ending of the delivery operation has been performed, the terminal authentication information is deleted from the storage unit.

The time at which the terminal authentication information stored in the storage unit of the delivery user terminal 200 is deleted is not limited to the above-mentioned example, and may be a time at which a predetermined time has elapsed from a time point at which the delivery user terminal 200 has received the terminal authentication information transmitted from the central server 400 (or a time point at which the central server 400 has transmitted the terminal authentication information to the delivery user terminal 200). The terminal authentication information is not limited to the above-mentioned one-time key, and may be a limited key which is valid in only a predetermined time period. It is assumed that device authentication information corresponding to the terminal authentication information is stored in advance in the key unit 100 regardless of whether the terminal authentication information is a one-time key or a limited key.

The request user terminal 50 will be described below. Similarly to the delivery user terminal 200, the request user terminal 50 may be, for example, a small computer such as a smartphone, a mobile phone, a tablet terminal, a personal information terminal, or a wearable computer (such as a smart watch) or may be a personal computer (PC). The request user terminal 50 includes a communication unit 51, a control unit 52, an input and output unit 53, and a short-range communication unit 54.

The communication unit 51 is communication means for connection to the network N1, which is functionally the same as the communication unit 202. The control unit 52 is a computer that takes charge of control of the request user terminal 50. The control unit 52 is constituted, for example, by a microcomputer, and functions of performing various processes are realized by causing a CPU (not illustrated) to execute a program stored in storage means (such as a ROM) (not illustrated). The input and output unit 53 is means that receives an input operation which has been performed by a request user and provides information to the request user, which is functionally the same as the input and output unit 204.

The short-range communication unit 54 is means that communicates with the key unit 100 using the same communication standard as the short-range communication unit 103 of the key unit 100. By causing the control unit 52 to perform a process of acquiring terminal authentication information from the central server 400 and to transmit the acquired terminal authentication information to the key unit 100 via the short-range communication unit 54 by short-range radio communication, the locking/unlocking device 300 can be operated by the request user terminal 50.

The delivery management server 500 will be described now. The delivery management server 500 has a general configuration of a computer, and at least one delivery management server is provided as a management server of each delivery company when a plurality of delivery companies participate in the luggage management system 1 as described above. The delivery management server 500 is, for example, a computer including a processor (not illustrated) such as a central processing unit (CPU) or a digital signal processor (DSP), a main storage unit (not illustrated) such as a random access memory (RAM) and a read only memory (ROM), and an auxiliary storage unit (not illustrated) such as an erasable programmable ROM (EPROM), a hard disk drive (HDD), and a removable medium. The removable medium is, for example, a universal serial bus (USB) memory or a disc recording medium such as a compact disc (CD) or a digital versatile disc (DVD). An operating system (OS), various programs, various tables, and the like are stored in the auxiliary storage unit, and functions corresponding to a predetermined purpose can be realized by loading a program stored therein into a work area of the main storage unit, executing the loaded program, and controlling the constituent units through execution of the program.

The delivery management server 500 further includes a communication unit 501. The communication unit 501 is connected to another device and performs communication between the delivery management server 500 and the other device (for example, the central server 400 or the delivery user terminal 200). The communication unit 501 is, for example, a local area network (LAN) interface board or a radio communication circuit for radio communication. The LAN interface board or the radio communication circuit is connected to the network N1 such as the Internet which is a public communication network.

The delivery management server 500 includes a delivery management database (DB) 503 that stores the above-mentioned delivery information. The delivery management DB 503 is configured by storing the delivery information in the auxiliary storage unit in which a request user and the delivery information are correlated with each other. The delivery management DB 503 is constructed by causing a program of a database management system (DBMS) which is executed by the processor to manage data stored in the auxiliary storage unit. The delivery management DB 503 is, for example, a relational database.

A structure of delivery information stored in the delivery management DB 503 will be described below with reference to FIG. 5. FIG. 5 illustrates a table structure of delivery information, and a delivery information table includes fields of request user ID, delivery date and time, delivery place, delivery status, and luggage attributes. Identification information for identifying a request user is input to the field of request user ID. Information indicating a date and time at which luggage is delivered is input to the field of delivery date and time, and a specific time may be input as the delivery time or a specific time period in which delivery is requested may be input as the delivery time. Information indicating whether delivery of luggage has been completed by a delivery user is input to the field of delivery status. For example, "completed" is input when the delivery of luggage has been completed, and "not completed" is input thereto when the delivery of luggage has not been completed. Attribute information such as a weight and a size of luggage is input to the field of luggage attributes.

In the delivery management server 500, a control unit 502 is embodied as a functional unit by execution of a program by the processor. The control unit 502 performs management and control of registration and update of delivery information in the delivery management DB 503 or the like. For example, when a request user requests delivery of luggage using the request user terminal 50, the control unit 502 correlates the delivery date and time, the delivery place, and the like with the identification information of the request user, generates delivery information corresponding to the request user, and stores the generated delivery information in the delivery management DB 503. When an information change notification of the delivery date and time or the delivery place has been transmitted from the request user after the delivery information has been generated, the control unit 502 updates the delivery information stored therein in response to the change. The control unit 502 communicates with the delivery user terminal 200 via the communication unit 501 and also updates information on a status of luggage included in the delivery information. For example, the control unit 502 receives the status information (for example, information indicating completion of delivery) which has been input from the delivery user terminal 200 via the input and output unit 204 by a delivery user and updates the corresponding delivery information.

Figure 12:
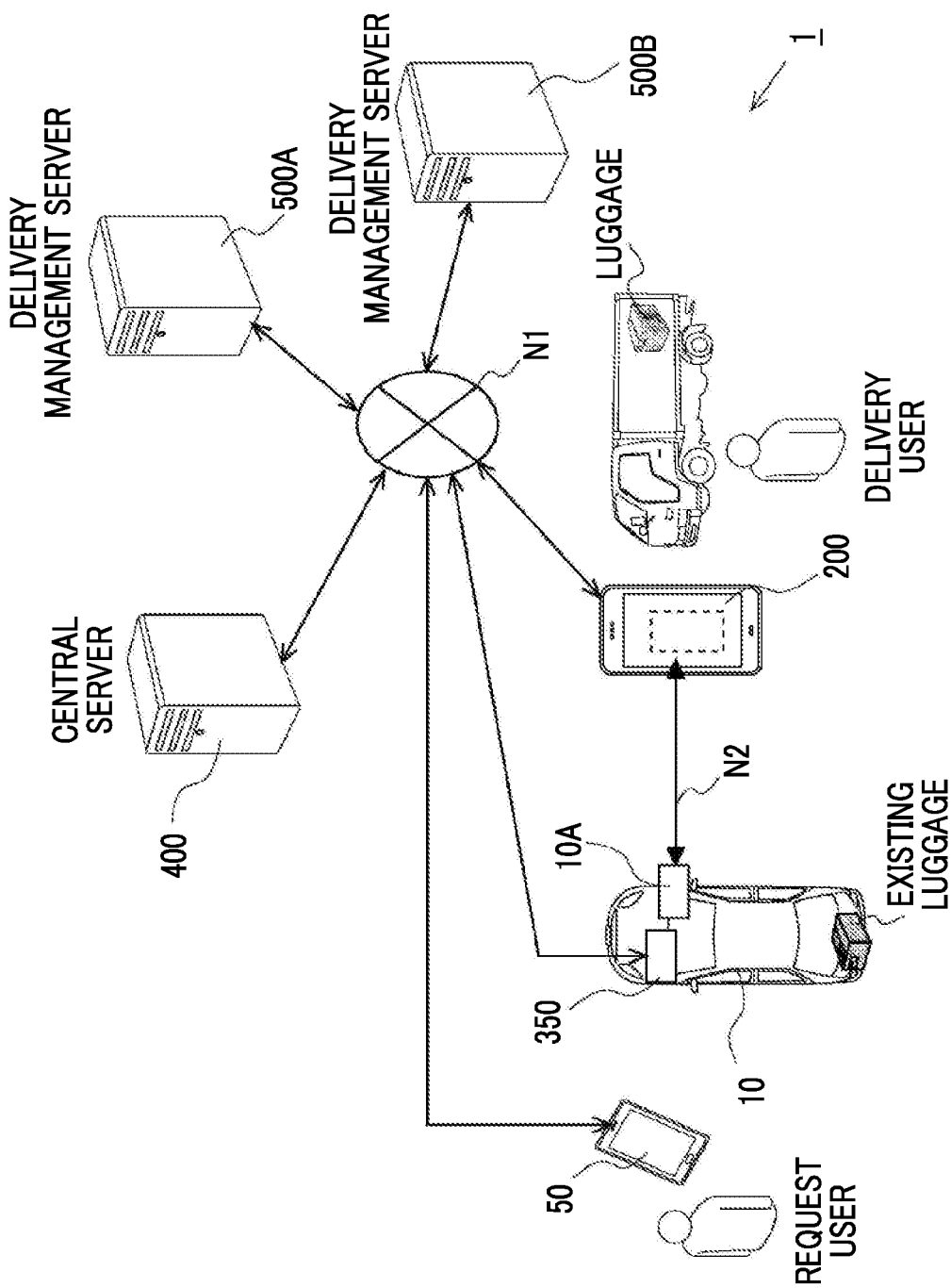
FIG. 12 is a diagram schematically illustrating a configuration of a luggage management system according to a second embodiment.
Figure 13:
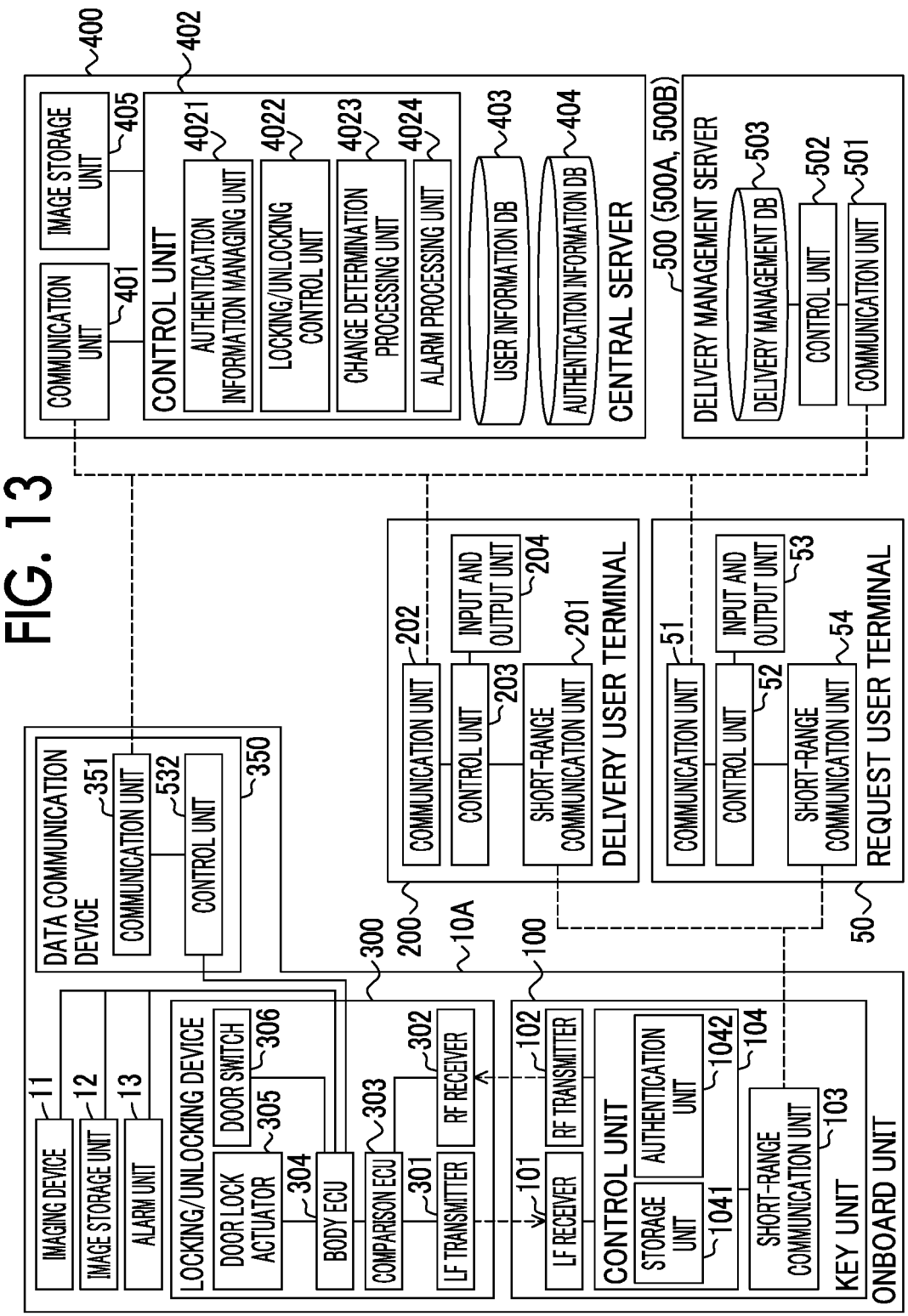
FIG. 13 is a block diagram schematically illustrating an example of a configuration of the luggage management system according to the second embodiment.

Vehicle management information in which a request user and a vehicle 10 as the corresponding delivery place are correlated is also stored in the delivery management DB 503. The structure of the vehicle management information will be described below with reference to FIG. 6. FIG. 6 illustrates a table structure of the vehicle management information, and a vehicle management information table includes a field of request user ID, and a field of vehicle model, a field of vehicle color, and a field of vehicle number to which information (a vehicle model, a vehicle color, and a vehicle number) for identifying a vehicle 10 is input such that a delivery user can find the vehicle 10 when the vehicle 10 has been selected as the delivery place by the request user. The vehicle management information table also includes a field of vehicle position to which position information on a position at which the vehicle 10 is located is input. The position information of the vehicle 10 may be acquired by an input via the request user terminal 50 from the request user, or the position information of the vehicle 10 which is acquired by the central server 400 may be acquired from the central server 400 via the data communication device 350 mounted in the vehicle 10 as illustrated in FIGS. 12 and 13.

The control unit 502 transmits a delivery instruction to the corresponding delivery user terminal 200 such that the delivery user can deliver luggage to the vehicle 10 based on the delivery information and the vehicle management information which are correlated with the request user. The delivery instruction may be transmitted to the delivery user terminal 200 a plurality of times, not only one time. For example, delivery instructions associated with delivery on the next day may be transmitted together to the delivery user terminals 200 on the day before a scheduled delivery date and the delivery instructions may be transmitted again on the current day of the delivery date. When the delivery information or the vehicle management information has been updated, the updated details are reflected at the time of retransmission.

One of the functional elements of the delivery management server 500 or some of the processes thereof may be embodied by another computer connected to the network N1. A sequence of processes which are performed by the delivery management server 500 may be implemented in hardware or may be implemented in software.

The central server 400 will be described below. The central server 400 has a general configuration of a computer, and a basic hardware configuration thereof is the same as the delivery management server 500. Specifically, the central server 400 includes a processor, a main storage unit, and an auxiliary storage unit which are not illustrated. Accordingly, in the central server 400, functions corresponding to a predetermined purpose can be realized by loading a program stored in the auxiliary storage unit into a work area of the main storage unit, executing the loaded program, and controlling the constituent units or the like through execution of the program. The central server 400 also includes a communication unit 401. The communication unit 401 is functionally the same as the communication unit 501 of the delivery management server 500 and performs communication between the central server 400 and another device (for example, the delivery management server 500).

The central server 400 includes a user information DB 403 and an authentication information DB 404 that store a variety of information in the auxiliary storage unit. Such databases (DB) are constructed by causing a program of a database management system which is executed by the processor to manage data stored in the auxiliary storage unit. The user information DB 403 and the authentication information DB 404 are, for example, relational databases.

The user information DB 403 stores identification information of a user who uses the vehicle 10 (for example, a delivery user who delivers luggage to the vehicle 10 or the like and a request user who receives the delivered luggage) and a corresponding password.

The authentication information DB 404 stores, for example, authentication information for a vehicle 10 which corresponds to the terminal authentication information. The authentication information for the vehicle 10 is information which is correlated with the identification information (a key ID) for the vehicle 10 and can be set to, for example, identification information specific to the key unit 100 of the onboard unit 10A. The authentication information DB 404 may store information on a validity period (which includes a validity time period) of the authentication information, whether the authentication information is invalidated, and the like in addition to the authentication information for the vehicle 10. The validity period of the authentication information may be transmitted to the delivery user terminal 200 along with the authentication information. When the validity period of the authentication information is received, the delivery user terminal 200 can invalidate the authentication information of which the validity period has expired by deleting the authentication information. Information about whether the authentication is invalidated indicates whether the authentication information has been transmitted to the delivery user terminal 200 and is valid or whether the validity period has expired and the authentication information is invalid. When the authentication information is transmitted to the delivery user terminal 200 and is valid, an authentication information managing unit 4021 which will be described later can prohibit the authentication information from being issued with overlapping validity periods and avoid duplicated issuance of the authentication information.

In the central server 400, a control unit 402 is embodied as a functional unit by causing the processor to execute a program. The control unit 402 performs control associated with issuance of authentication information to the delivery user terminal 200 or the like. Specifically, the control unit 402 includes an authentication information managing unit 4021 and a locking/unlocking control unit 4022 as functional units.

The authentication information managing unit 4021 controls issuance of authentication information for locking and unlocking the vehicle 10. Specifically, the authentication information managing unit 4021 receives a request for transmission of authentication information for locking and unlocking the vehicle 10 from the delivery user terminal 200 via the delivery management server 500. The authentication information managing unit 4021 receives information on the delivery user terminal 200 which is a transmission destination of the authentication information along with the request for transmission of authentication information. The authentication information managing unit 4021 transmits authentication information corresponding to the key unit 100 (terminal authentication information) to the delivery user terminal 200 via the delivery management server 500. The authentication information managing unit 4021 may generate authentication information including information on a validity period. When the authentication information including information on the validity period has been received but the validity period has expired, the key unit 100 of the onboard unit 10A determines that the authentication information has been invalidated and does not perform locking and unlocking of the vehicle 10.

The body ECU 304 according to this embodiment will be described below in detail. The imaging processing unit 3043 captures a moving image in the cargo compartment 15 of the vehicle 10 by controlling the imaging device 11 based on an ON/OFF signal output from the door switch 306 with opening and closing of the cargo compartment door 16 of the vehicle 10. Specifically, the imaging processing unit 3043 causes the imaging device 11 to start capturing of a moving image when the door switch 306 has been switched from an OFF state to an ON state with change of the cargo compartment door 16 from a closed state to an open state, and then causes the imaging device 11 to end capturing of a moving image when the door switch 306 has been switched from the ON state to the OFF state with change of the cargo compartment door 16 from the open state to the closed state. The imaging processing unit 3043 stores the moving image captured by the imaging device 11 as image data in the image storage unit 12. By controlling the imaging device 11 and storing an image in the image storage unit 12 in this way, the body ECU 304 may serve as a "control device" in the claims.

Capturing of an image by the imaging device 11 is performed when a delivery user locks or unlocks the cargo compartment 15 of the vehicle 10 using authentication information received by the delivery user terminal 200. That is, when a delivery user locks or unlocks the cargo compartment 15 using a one-time key, the locking/unlocking processing unit 3041 sends a signal indicating locking or unlocking to the imaging processing unit 3043, and the imaging processing unit 3043 having received the signal controls the imaging device 11 such that a moving image is captured. On the other hand, when a request user locks or unlocks the cargo compartment 15 of the vehicle 10 using authentication information stored in the request user terminal 50, the locking/unlocking processing unit 3041 does not send a signal indicating locking or unlocking of the cargo compartment 15 to the imaging processing unit 3043. Accordingly, even if a request user locks or unlocks the cargo compartment 15, capturing of a moving image by the imaging device 11 is not performed. When a request user locks or unlocks the cargo compartment 15, capturing of an image by the imaging device 11 may be performed similarly to the case of a delivery user.

The change determination processing unit 3042 performs a process of determining whether luggage has been carried away (hereinafter also referred to as a "change determining process") based on an image captured by the imaging device 11. By causing the change determination processing unit 3042 to perform the change determining process, a "determination unit" in the claims may be embodied. The determination unit may be provided in a vehicle, may be provided in a terminal of a user, or may be provided in a server that manages information on locking/unlocking or a server that manages delivery. This change determining process is started, for example, with storage of an image in the image storage unit 12 as a trigger when capturing of an image by the imaging device 11 ends. In the change determining process, the change determination processing unit 3042 extracts an image (hereinafter referred to as a "reference image") immediately after the cargo compartment door 16 in the vehicle 10 has switched from the closed state to the open state (that is, immediately after a signal input from the door switch 306 to the body ECU 304 has been switched from the OFF state to the ON state) and an image (hereinafter referred to as a "comparison image") immediately after the cargo compartment door 16 in the vehicle 10 has been switched from the open state to the closed state (that is, immediately after the signal input from the door switch 306 to the body ECU 304 has been switched from the ON state to the OFF state) from a moving image stored in the image storage unit 12 and compares both images. The reference image and the comparison image may be stored in the image storage unit 12 or may be stored in a memory (not illustrated) in the imaging processing unit 3043.

In order for the imaging processing unit 3043 to cause the imaging device 11 to capture a moving image in a period from a time point at which the signal from the door switch 306 has been switched from the OFF state to the ON state to a time point at which the signal has been switched from the ON state to the OFF state, the change determination processing unit 3042 can be said to compare an image at a start time point of the moving image captured by the imaging device 11 as a reference image and an image at an end time point of the moving image as a comparison image with each other. Until the door switch 306 is switched to the ON state after the cargo compartment 15 has been unlocked, the cargo compartment door 16 is closed and thus a delivery user cannot access the cargo compartment 15. Accordingly, since the state in the cargo compartment 15 does not change until the door switch 306 is switched to the ON state after the cargo compartment 15 has been locked, the reference image can be said to be an image indicating the state in the cargo compartment 15 when the cargo compartment 15 has been unlocked. That is, the reference image can be said to be an image which is captured at a time associated with a time at which the cargo compartment 15 is unlocked. Until the cargo compartment 15 is locked after the door switch 306 has been switched to the OFF state, the cargo compartment door 16 is in the closed state and thus a delivery user cannot access the cargo compartment 15. Accordingly, since the state in the cargo compartment 15 does not change until the cargo compartment 15 is locked after the door switch 306 has been switched to the OFF state, the comparison image can be said to be an image indicating the state in the cargo compartment 15 when the cargo compartment 15 has been locked. That is, the comparison image can be said to be an image captured at a time associated with a time at which the cargo compartment 15 is locked. The reference image, the comparison image, and the moving image stored in the image storage unit 12 can be said to be images obtained by causing the imaging device 11 to capture an image in the cargo compartment 15 at the times of locking/unlocking of the cargo compartment 15 (a predetermined area) with the locking/unlocking device 300 in response to a request from the delivery user terminal 200.

The change determination processing unit 3042 compares the reference image with the comparison image and determines that existing luggage has been carried away from the cargo compartment 15 when it is determined that luggage which is already present in the cargo compartment 15 in the reference image (hereinafter also referred to as existing luggage) is not present in the cargo compartment 15 in the comparison image. When there is no difference between the reference image and the comparison image as the result of comparison between the reference image and the comparison image, the change determination processing unit 3042 determines that luggage to be delivered has not been delivered, that is, that luggage has been carried away by a delivery user. When it is determined that an object which is not present in the cargo compartment 15 in the reference image is present in the cargo compartment 15 in the comparison image, the change determination processing unit 3042 may determine that luggage has been delivered by a delivery user. The determination method in the change determination processing unit 3042 is not particularly limited as long as it can determine that luggage has been taken in or out of the cargo compartment 15 based on a reference image and a comparison image.

When it is determined that luggage has been carried away through the change determining process, the change determination processing unit 3042 stores the reference image and the comparison image in the image storage unit 12 as a reference image and a comparison image when the luggage has been carried away. When it is determined that luggage has been delivered by a delivery user through the change determining process, the change determination processing unit 3042 may delete the moving image, the reference image, and the comparison image stored in the image storage unit 12 (which are hereinafter referred to as stored image data) from the image storage unit 12 or may delete only the moving image from the image storage unit 12. The stored image data may be stored in the image storage unit 12 when there is a margin in a memory capacity of the image storage unit 12, and the stored image data may be deleted from the oldest one when there is no margin in the memory capacity.

When it is determined that luggage has been carried away through the change determining process, the change determination processing unit 3042 sends a signal indicating the determination result to the alarm processing unit 3044. When a signal from the change determination processing unit 3042 has been received, the alarm processing unit 3044 performs a predetermined notification process. The "predetermined notification process" mentioned herein is, for example, a process of operating a notification unit 13 mounted in the vehicle 10. That is, the notification unit 13 is activated when a signal indicating carrying-away of luggage (hereinafter also referred to as a carrying-away signal) is received from the alarm processing unit 3044. The carrying-away of luggage is notified to the surroundings by activation of the notification unit 13. The notification can include a warning by sound (which includes ringing of a klaxon or outputting of voice indicating carrying-away of luggage) or turning-on or flickering of a lamp or the like. Accordingly, a delivery user who is going to carry away luggage may be warned or a third party near the vehicle 10 may be notified of the carrying-away of luggage. As illustrated in FIGS. 12 and 13 which will be described later, a carrying-away signal may be sent to the central server 400 or the request user terminal 50 via the data communication device 350 mounted in the vehicle 10. By causing the alarm processing unit 3044 to perform a predetermined notification process in this way, the function of an "alarm unit" in the claims may be embodied. The notification unit may be provided in a vehicle, may be provided in a terminal of a user, or may be provided in a server that manages information for locking/unlocking or a server that manages delivery.

Figure 7:
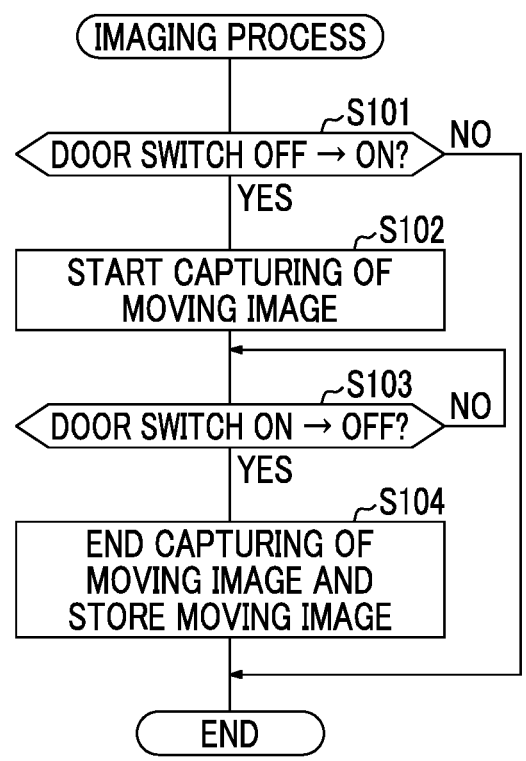
FIG. 7 is a flowchart illustrating a process flow of capturing and storing a moving image for determining whether luggage has been carried away.

FIG. 7 is a flowchart illustrating a flow of processes of capturing and storing a moving image for determining carrying-away of luggage. In the following description, a process of capturing an image for determining carrying-away of luggage and storing the captured image is also referred to as an imaging process. In Step S101, the imaging processing unit 3043 determines whether a signal from the door switch 306 has been switched from the OFF state to the ON state. In Step S101, the imaging processing unit 3043 determines whether a start time of imaging by the imaging device 11 has been reached. When the determination result of Step S101 is negative, the flow of processes ends. On the other hand, when the determination result of Step S101 is positive, the imaging processing unit 3043 starts capturing of a moving image by controlling the imaging device 11 in Step S102. Then, in Step S103, the imaging processing unit 3043 determines whether the signal from the door switch 306 has been switched from the ON state to the OFF state. In Step S103, the imaging processing unit 3043 determines whether an end time of capturing a moving image by the imaging device 11 has been reached. When the determination result of Step S103 is negative, capturing of a moving image by the imaging device 11 is continuously performed. On the other hand, when the determination result is positive, the process flow transitions to Step S104.

In Step S104, the imaging processing unit 3043 ends capturing of a moving image by controlling the imaging device 11 and stores the moving image captured by the imaging device 11 in the image storage unit 12. Then, the imaging processing unit 3043 sends a signal indicating that the imaging has ended to the change determination processing unit 3042. When a still image is captured by the imaging device 11, the imaging processing unit 3043 captures a still image and stores the still image in the image storage unit 12 instead of starting the capturing of a moving image in Step S102, and captures a still image and stores the still image in the image storage unit 12 instead of ending the capturing of a moving image in Step S104.

Figure 8:
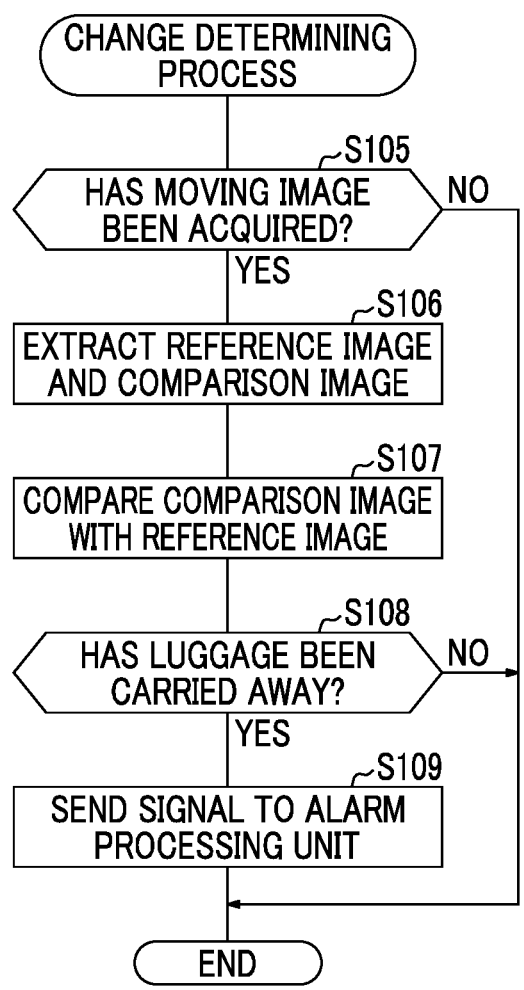
FIG. 8 is a flowchart illustrating a flow of a change determining process.

The change determining process of determining whether carrying-away of luggage has occurred based on the image stored in the image storage unit 12 will be described below. FIG. 8 is a flowchart illustrating a flow of the change determining process. The change determining process according to this embodiment is performed by the onboard unit 10A. In Step S105, the change determination processing unit 3042 determines whether a moving image is stored in the image storage unit 12. When the determination result of Step S105 is negative, the process flow ends. On the other hand, when the determination result of Step S105 is positive, the process flow transitions to Step S106. In Step S106, the change determination processing unit 3042 extracts a reference image and a comparison image from the moving image stored in the image storage unit 12. When the imaging processing unit 3043 causes the imaging device 11 to capture a still image, the change determination processing unit 3042 determines whether a reference image and a comparison image are stored in the image storage unit 12 in Step S105, and Step S106 is skipped.

The change determination processing unit 3042 compares the comparison image with the reference image in Step S107, and determines whether carrying-away of luggage has occurred in Step S108. When the determination result of Step S108 is negative, the process flow ends. On the other hand, when the determination result of Step S108 is positive, the process flow transitions to Step S109 and the change determination processing unit 3042 sends a carrying-away signal to the alarm processing unit 3044 and ends the process flow. The alarm processing unit 3044 having received the carrying-away signal from the change determination processing unit 3042 performs a predetermined notification process.

Figure 9:
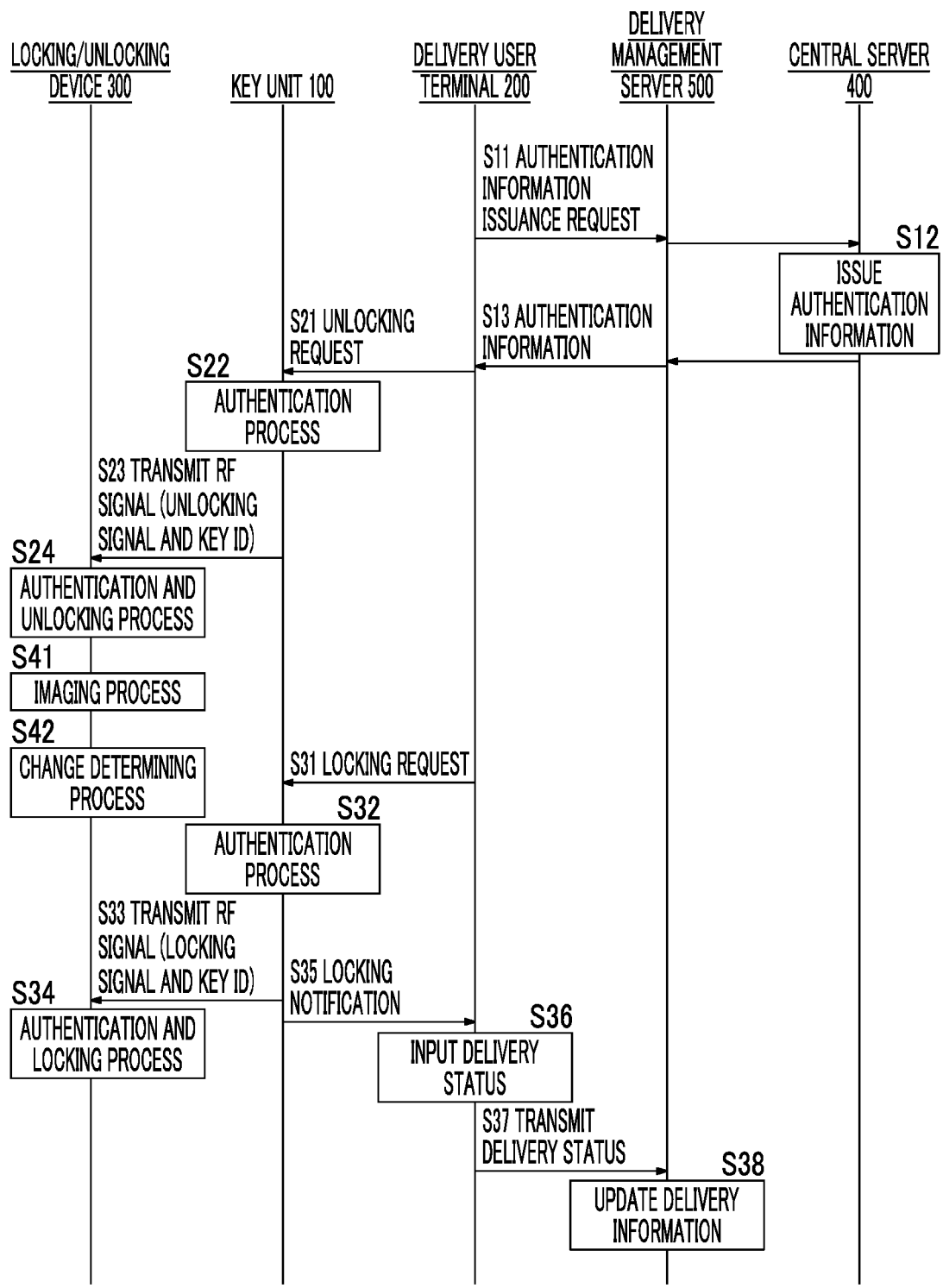
FIG. 9 is a diagram illustrating a flow of operations in the luggage management system when a change determination processing unit determines that luggage has been carried away.

The operation of the luggage management system 1 when the change determination processing unit 3042 determines that luggage has been carried away will be described below with reference to FIG. 9. In the process flow illustrated in FIG. 9, when a delivery user arrives at the vicinity of a vehicle 10 in order to deliver luggage in response to a delivery request from a request user, the process of Step S11 is performed, that is, a request for issuance of authentication information is transmitted from the delivery user terminal 200 to the central server 400 via the delivery management server 500. Then, the central server 400 issues authentication information for the vehicle 10 correlated with identification information of the request user based on the identification information of the request user included in the delivery information (the process of Step S12).

In Step S13, the issued authentication information is transmitted to the delivery user terminal 200 via the delivery management server 500. When the authentication information transmitted from the central server 400 in this way is received by the delivery user terminal 200, an operation of locking and unlocking the cargo compartment 15 of the vehicle 10 using the delivery user terminal 200 becomes possible.

Then, a process of unlocking the cargo compartment 15 of the vehicle 10 using the delivery user terminal 200 is performed in Steps S21 to S24. In performing the processes of Steps S21 to S24, it is assumed that the delivery user terminal 200 has been moved to a position at which short-range radio communication is set up between the key unit 100 of the vehicle 10 and the delivery user terminal 200 by the delivery user.

When a delivery user performs an operation of unlocking the vehicle 10 via the input and output unit 204 of the delivery user terminal 200, the delivery user terminal 200 transmits an unlocking request including authentication information to the key unit 100 in Step S21. Then, when the unlocking request transmitted from the delivery user terminal 200 is received by the key unit 100, the key unit 100 performs an authentication process by comparing the authentication information (terminal authentication information) included in the unlocking request with the authentication information (device authentication information) stored in the storage unit 1041 in Step S22. When the authentication using both pieces of authentication information has succeeded, the key unit 100 transmits an unlocking signal and a key ID to the locking/unlocking device 300 in Step S23. When the unlocking signal and the key ID transmitted from the key unit 100 are received by the locking/unlocking device 300, the locking/unlocking device 300 performs an authentication process based on the received key ID in Step S24. As a result, when the authentication has succeeded, the cargo compartment 15 of the vehicle 10 is unlocked. At this time, the locking/unlocking device 300 may return an answerback or the like to the key unit 100.

In Step S31 to S38, a process of locking the vehicle 10 and a process of associated with the locking are performed using the delivery user terminal 200. When the delivery user opens the cargo compartment door 16 through an unlocking process, performs a predetermined delivery operation, then closes the cargo compartment door 16, and performs an operation of locking the vehicle 10 via the input and output unit 204 of the delivery user terminal 200, the delivery user terminal 200 transmits a locking request including authentication information to the key unit 100 in Step S31. When the locking request transmitted from the delivery user terminal 200 is received by the key unit 100, the key unit 100 performs an authentication process by comparing the authentication information (terminal authentication information) included in the locking request transmitted from the delivery user terminal 200 with authentication information (device authentication information) stored in the storage unit 1041 in Step S32. When authentication using both pieces of authentication information has succeeded, the key unit 100 transmits a locking signal and a key ID to the locking/unlocking device 300 in Step S33. When the locking signal and the key ID transmitted from the key unit 100 are received by the locking/unlocking device 300, the locking/unlocking device 300 performs an authentication process based on the received key ID in Step S34. When the authentication has also succeeded, the cargo compartment 15 of the vehicle 10 is locked. The key unit 100 transmits a notification indicating that locking has been completed (a locking notification) to the delivery user terminal 200 (the process of Step S35) after transmitting the locking signal to the locking/unlocking device 300. Accordingly, the notification indicating that locking has been completed is output onto the touch panel screen of the delivery user terminal 200.

When the delivery user ascertains that delivery of luggage has been completed from the locking notification, the delivery user inputs a latest delivery status, that is, a status indicating that delivery has been completed, via the input and output unit 204 of the delivery user terminal 200 to update the delivery status in the delivery information stored in the delivery management server 500 (the process of Step S36). Accordingly, the latest delivery status is transmitted from the delivery user terminal 200 to the delivery management server 500 (the process of Step S37). As a result, in the delivery management server 500 having received the latest delivery status, the control unit 502 updates the delivery information (the process of Step S38). Regarding update of the delivery status, instead of causing the delivery user to input information therefor, when the delivery user terminal 200 receives the locking notification from the key unit 100, the delivery user terminal 200 may transmit an update command to set the delivery status to completed delivery to the delivery management server 500. When the authentication information used by the delivery user terminal 200 in the current delivery operation is a one-time key, the authentication information acquired in Step S13 may be invalidated at a time at which the delivery user terminal 200 has received the locking notification in the process of Step S35. That is, the authentication information stored in the storage unit of the delivery user terminal 200 may be deleted from the delivery user terminal 200 at the time at which the delivery user terminal 200 has received the locking notification.

When the cargo compartment 15 of the vehicle 10 is unlocked in Step S24, the locking/unlocking device 300 performs the imaging process illustrated in FIG. 7 in Step S41 and the locking/unlocking device 300 performs the change determining process illustrated in FIG. 8 in Step S42. That is, when the delivery user opens the cargo compartment door 16 and the door switch 306 is switched from the OFF state to the ON state after the cargo compartment door 16 of the vehicle 10 has been unlocked in Step S24, the locking/unlocking device 300 causes the imaging device 11 to start capturing of an image. This capturing of an image is continuously performed until the delivery user closes the cargo compartment door 16 and the door switch 306 is switched from the ON state to the OFF state. When the door switch 306 has been switched from the ON state to the OFF state, the change determining process is performed. The locking/unlocking device 300 extracts a reference image and a comparison image from the image storage unit 12 and compares both images. When it is determined as the comparison result between both images that luggage has been carried away, a predetermined notification process is performed.

Even when it is determined through the change determining process that luggage has been carried away, it is conceivable that luggage has not been actually carried away as a result of ascertainment of luggage by the request user. That is, an error may occur in the change determining process. On the other hand, the change determination processing unit 3042 may learn the difference between the reference image and the comparison image serving as the error in the current determination such that it does not affect determination in a subsequent change determining process. Accordingly, it is possible to enhance determination accuracy in the change determining process. A request user sends a signal indicating that the current determination is erroneous to the onboard unit 10A via the communication unit 202 by operating the input and output unit 204 of the request user terminal 50. The change determination processing unit 3042 performs the learning in response to that signal. The learning result is stored in a memory which is not illustrated.

According to the above-mentioned embodiment, when luggage has been carried away in the luggage management system 1 in which a cargo compartment 15 of a vehicle 10 is used as a pickup and delivery place of luggage, it is possible to contribute to improvement in security by giving a notification. By storing an image captured by the imaging device 11 in the image storage unit 12, it is possible to store evidence for carrying-away of luggage.

MODIFIED EXAMPLE 1 OF FIRST EMBODIMENT

In the first embodiment, images at a time at which the ON/OFF state of the door switch 306 has changed are set as a reference image and a comparison image, but images at other times may be set as a reference image and a comparison image. That is, the reference image has only to be an image obtained by imaging the cargo compartment 15 in the same state as that at the time at which the cargo compartment 15 has been unlocked, and the comparison image has only to be an image obtained by imaging the cargo compartment 15 in the same state as that at the time at which the cargo compartment 15 has been locked. In the following description, a time at which an image to be set as the reference image is captured may be referred to as a first time, and a time at which an image to be set as the comparison image is captured may be referred to as a second time. The first time is a time associated with a time at which the cargo compartment 15 is unlocked, and the second time is a time at which the cargo compartment 15 is locked. The first time may correspond to an unlocking-associated time in the claims, and the second time may correspond to a locking-associated time in the claims. When the imaging device 11 captures a still image at the first time and the second time, the imaging processing unit 3043 causes the imaging device 11 to capture a still image at the first time and the second time and to store a reference image and a comparison image in the image storage unit 12. The change determination processing unit 3042 performs a change determining process based on the reference image and the comparison image stored in the image storage unit 12.

For example, a time at which the door lock actuator 305 has unlocked the cargo compartment 15 may be set as the first time. In this case, a time at which the locking/unlocking processing unit 3041 of the body ECU 304 has sent an unlocking signal to the door lock actuator 305 is set as the first time. When the cargo compartment 15 has been unlocked, it can be estimated that the cargo compartment door 16 is opened thereafter. Since it is difficult to access the cargo compartment 15 from the outside while the cargo compartment 15 is being locked, the state in the cargo compartment 15 when the cargo compartment door 16 was previously closed is considered to be kept at least until the cargo compartment 15 is unlocked. After the cargo compartment 15 has been unlocked, the cargo compartment door 16 can be opened and thus carrying-away of luggage is also possible. Accordingly, by setting the time at which the door lock actuator 305 has unlocked the cargo compartment 15 as the first time, the change determining process based on the state in the cargo compartment 15 before luggage in the cargo compartment 15 is taken in or out can be performed. Since the same state as that in a predetermined area at a time point at which the vehicle has been unlocked has only to be imaged, the imaging does not need to be performed at the time point at which the vehicle has been unlocked.

For example, the time at which the door lock actuator 305 has locked the cargo compartment 15 may be set as the second time. In this case, the locking/unlocking processing unit 3041 of the body ECU 304 sets a time point at which a locking signal has been transmitted to the door lock actuator 305 as the second time. When the cargo compartment 15 has been locked, it can be estimated that a current delivery user will not open the cargo compartment door 16 thereafter. That is, after the cargo compartment 15 has been locked, it is thought that the state in the cargo compartment 15 does not change until a next delivery user opens the cargo compartment door 16. Accordingly, the time at which the door lock actuator 305 has locked the cargo compartment 15 can be said to be a time at which arrangement of luggage in the cargo compartment 15 is settled. By setting this time as the second time, the change determining process based on the state in the cargo compartment 15 after a current delivery user has taken in or out luggage can be performed. Since the same state as the state in the predetermined area at the time point at which the vehicle has been locked has only to be imaged, it is not necessary to perform imaging at a time point at which the vehicle has been locked.

Figure 10:
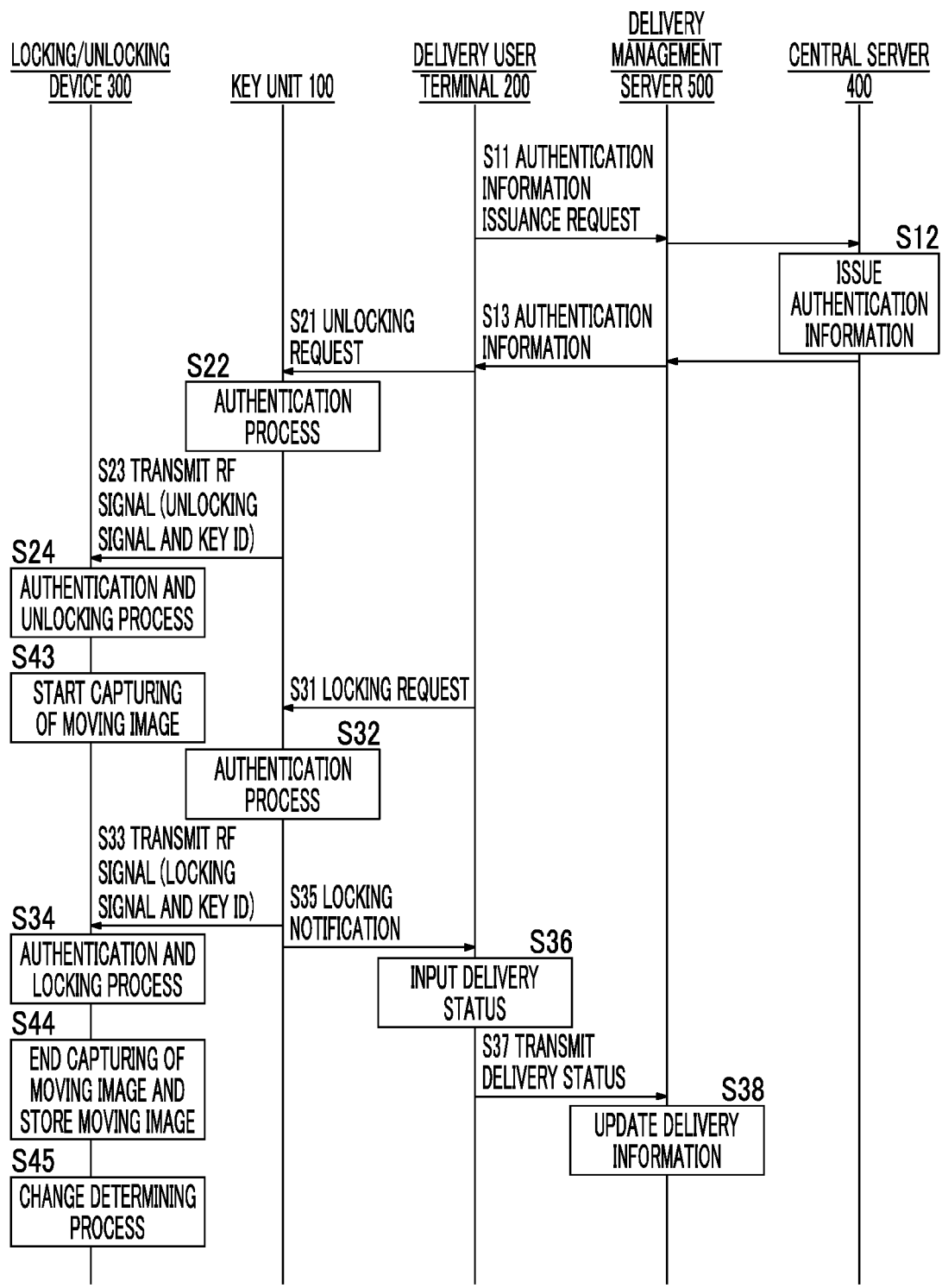
FIG. 10 is a diagram illustrating a flow of operations in the luggage management system when the change determination processing unit determines that luggage has been carried away.

The operation of the luggage management system 1 when the time at which the door lock actuator 305 has unlocked the cargo compartment 15 is set as the first time and the time at which the door lock actuator 305 has locked the cargo compartment 15 is set as the second time and when the change determination processing unit 3042 determines that luggage has been carried away will be described below with reference to FIG. 10. In FIG. 10, the same processes as in the process flow illustrated in FIG. 9 will be referred to by the same reference signs and description thereof will not be repeated. When the cargo compartment 15 of the vehicle 10 is unlocked in Step S24, the locking/unlocking device 300 causes the imaging device 11 to start capturing of a moving image in Step S43. When the cargo compartment 15 of the vehicle 10 is locked in Step S34, the locking/unlocking device 300 causes the imaging device 11 to end capturing of a moving image and stores the captured moving image in the image storage unit 12 in Step S44. In Step S45, the locking/unlocking device 300 performs the change determining process illustrated in FIG. 8.

For example, the time at which an unlocking signal has been transmitted from the key unit 100 to the locking/unlocking device 300 may be set as the first time, and the time at which a locking signal has been transmitted from the key unit 100 to the locking/unlocking device 300 may be set as the second time.

For example, a time at which the short-range communication unit 103 of the key unit 100 and the short-range communication unit 201 of the delivery user terminal 200 can perform short-range communication therebetween may be set as the first time. In this case, when the short-range communication unit 103 of the key unit 100 and the short-range communication unit 201 of the delivery user terminal 200 can perform short-range communication therebetween, the control unit 104 of the key unit 100 may transmit a signal indicating the state to the locking/unlocking device 300 via the RF transmitter 102. This signal may be transmitted from the comparison ECU 303 to the change determination processing unit 3042 of the body ECU 304. Here, since a communicable standard in a range in which the distance between the key unit 100 and the delivery user terminal 200 is relatively small is used for the short-range communication between the short-range communication unit 103 of the key unit 100 and the short-range communication unit 201 of the delivery user terminal 200, a radio field intensity decreases and communication is not possible when the key unit 100 and the delivery user terminal 200 is separated away from each other to a certain extent. Accordingly, when the short-range communication unit 103 of the key unit 100 and the short-range communication unit 201 of the delivery user terminal 200 can perform short-range communication therebetween, it can be estimated that the delivery user approaches the vehicle 10. In this state, since the cargo compartment door 16 is opened or closed or luggage is accommodated in the cargo compartment 15 thereafter, the time at which the short-range communication is possible before the state in the cargo compartment 15 has changed is set as the first time.

For example, a time at which the short-range communication unit 103 of the key unit 100 and the short-range communication unit 201 of the delivery user terminal 200 have changed from a state in which the short-range communication therebetween is possible to a state in which the short-range communication therebetween is not possible may be set as the second time. In this case, when the short-range communication unit 103 of the key unit 100 and the short-range communication unit 201 of the delivery user terminal 200 have changed from the state in which the short-range communication therebetween is possible to the state in which the short-range communication therebetween is not possible, the control unit 104 of the key unit 100 transmits a signal indicating the state to the locking/unlocking device 300 via the RF transmitter 102. This signal is transmitted from the comparison ECU 303 to the change determination processing unit 3042 of the body ECU 304. When the state in which the short-range communication is possible has changed to the state in which the short-range communication is not possible, it can be thought that a delivery user carrying the delivery user terminal 200 moves away from the vehicle 10 and it can be estimated that luggage has not been taken in or out thereafter. In this way, when the state in which the short-range communication is possible has changed to the state in which the short-range communication is not possible, the state in the cargo compartment 15 does not change thereafter and thus this time is set as the second time.

The imaging processing unit 3043 may control the imaging device 11 such that a still image is captured at predetermined intervals. In this case, the first time and the second time may be determined by a request user, or an imaging time immediately before or after the cargo compartment door 16 is opened may be set as the first time and an imaging time immediately before or after the cargo compartment door 16 is closed may be set as the second time.

MODIFIED EXAMPLE 2 OF FIRST EMBODIMENT

It is preferable that the imaging device 11 be disposed at a position at which a wide area in the cargo compartment 15 can be imaged. In the example illustrated in FIG. 3, the imaging device 11 is disposed on the ceiling of the cargo compartment 15 in the vicinity of the center of the cargo compartment 15 in the longitudinal direction of the vehicle 10 and in the vicinity of the center of the cargo compartment 15 in the lateral direction of the vehicle 10. The position at which the imaging device 11 is disposed is not limited to the example illustrated in FIG. 3, and may be set to a position at which the entire range in the cargo compartment 15 can be imaged. Here, when luggage is accommodated close to the imaging device 11, a dead angle may be formed in the imaging device 11 due to the luggage and thus there is concern that accuracy of the change determining process may decrease. For example, even when luggage is arranged at a dead angle of the imaging device 11 or luggage arranged at the dead angle is carried away, it may not be detected depending on an image captured by the imaging device 11.

Figure 11:
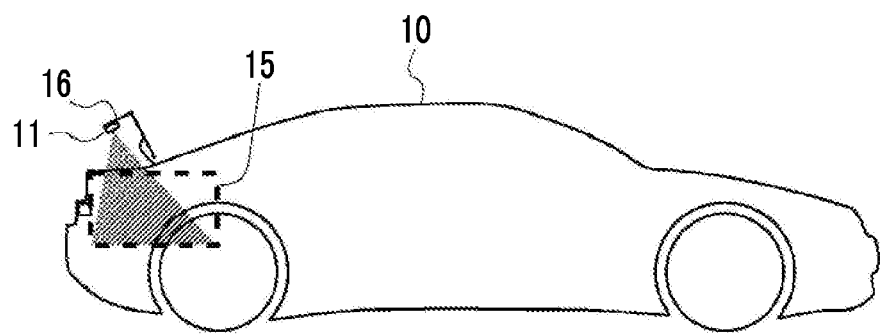
FIG. 11 is a diagram illustrating a state in which an imaging device is attached to a cargo compartment inside a cargo compartment door.

Therefore, the imaging device 11 may be attached to the cargo compartment door 16. FIG. 11 is a diagram illustrating a state in which the imaging device 11 is attached to the cargo compartment door 16 inside the cargo compartment 15. A hatched area in FIG. 11 represents a range which is imaged by the imaging device 11. In this case, the imaging device 11 is disposed such that the imaging device 11 can image the entire range in the cargo compartment 15 when the cargo compartment door 16 is opened. Then, in the state in which the cargo compartment door 16 has been opened, the distance between the imaging device 11 and the inside of the cargo compartment 15 increases and the distance between the imaging device 11 and luggage increases in comparison with the case illustrated in FIG. 3, and thus the dead angle of the imaging device 11 decreases even when luggage with the same size is accommodated in the cargo compartment 15. Accordingly, it is possible to enhance accuracy of the change determining process. In this case, a moving image is captured from a time point at which the cargo compartment 15 is unlocked to a time point at which the cargo compartment 15 is locked, a reference image is extracted from the moving image captured immediately after the cargo compartment door 16 has been opened, and a comparison image is extracted from the moving image captured immediately before the cargo compartment door 16 has been closed.

Second Embodiment

In the first embodiment, the change determination processing unit 3042 in the vehicle 10 performs the change determining process, but the central server 400 performs the change determining process in a second embodiment. FIG. 12 is a diagram schematically illustrating a configuration of a luggage management system 1 according to this embodiment. FIG. 13 is a block diagram schematically illustrating an example of configurations of an onboard unit 10A, a delivery user terminal 200, a request user terminal 50, a delivery management server 500, and a central server 400 which constitute the luggage management system 1 according to this embodiment. Differences from the first embodiment will be mainly described below.

A data communication device 350 is provided in the onboard unit 10A. The data communication device 350 is a communication device that is connected to the central server 400 via a network N1 and can transmit and receive data to and from the central server 400. The data communication device 350 includes a communication unit 351 and a control unit 352. The communication unit 351 is communication means that connects the onboard unit 10A to the network N1. In this embodiment, the communication unit 351 can communicate with another device (for example, the central server 400) via the network N1 using a mobile communication service such as 3G ($3^{rd}$ Generation) or LTE (Long Term Evolution).

The control unit 352 is a computer that takes charge of control of the data communication device 350. The control unit 352 performs, for example, a process of transmitting image data stored in the image storage unit 12 to the central server 400. The control unit 352 is constituted, for example, by a microcomputer, and the functions of performing the above-mentioned processes are realized by causing a CPU (not illustrated) to execute a program stored in storage means (such as a ROM) (not illustrated). When a moving image captured by the imaging device 11 is stored in the image storage unit 12, the locking/unlocking processing unit 3041 sends a signal to the control unit 352 such that image data is transmitted to the central server 400. This image data is received by the control unit 352 via the body ECU 304, and the control unit 352 transmits the image data to the central server 400 via the communication unit 351. This image data is transmitted in correlation with identification information of a request user.

When the communication unit 401 of the central server 400 receives the image data, the control unit 402 of the central server 400 stores the image data in the image storage unit 405. The image storage unit 405 stores the image data using an erasable programmable ROM (EPROM), a hard disk drive (HDD), a removable medium, or the like. The control unit 402 of the central server 400 additionally includes a change determination processing unit 4023 and an alarm processing unit 4024. The change determination processing unit 4023 performs a change determining process based on the image data stored in the image storage unit 405.

The change determining process is performed in the same way as the change determining process in the onboard unit 10A described in the first embodiment. That is, the change determination processing unit 4023 extracts a reference image and a comparison image from the moving image, compares both images, and determines whether luggage has been carried away.

Accordingly, the change determination processing unit 3042 does not need to be provided in the body ECU 304 of the locking/unlocking device 300. The imaging processing unit 3043 of the body ECU 304 may store only still images captured at the first time and the second time as a reference image and a comparison image in the image storage unit 12, or may store only images extracted from the moving image at the first time and the second time as a reference image and a comparison image in the image storage unit 12. In this case, since only the reference image and the comparison image are transmitted to the central server 400 via the data communication device 350, an amount of data to be transmitted decreases in comparison with a case in which a moving image is transmitted.

When it is determined through the change determining process that luggage has been carried away, the change determination processing unit 4023 sends a signal indicating the fact to the alarm processing unit 4024. When the signal from the change determination processing unit 4023 is received, the alarm processing unit 4024 performs a predetermined notification process. The "predetermined notification process" mentioned herein includes, for example, at least one of (1) a process of transmitting a carrying-away signal to the onboard unit 10A to operate the notification unit 13 mounted in the vehicle 10, (2) a process of transmitting a carrying-away signal to the delivery user terminal 200, and (3) a process of transmitting a carrying-away signal to the request user terminal 50.

In the process of (1), the alarm processing unit 4024 transmits a carrying-away signal to the communication unit 351 of the data communication device 350 via the communication unit 401. When the communication unit 351 of the data communication device 350 receives the carrying-away signal, the control unit 352 transmits the carrying-away signal to the alarm processing unit 3044 of the body ECU 304. The alarm processing unit 3044 having received the carrying-away signal performs the same notification process as in the first embodiment.

In the process of (2), the alarm processing unit 4024 transmits the carrying-away signal to the delivery user terminal 200 via the communication unit 401. When the communication unit 202 of the delivery user terminal 200 receives the carrying-away signal, the control unit 203 displays a notification about carrying-away of luggage on the input and output unit 204. In addition to the touch panel display, means that gives a notification about carrying-away of luggage by sound or vibration may be provided in the input and output unit 204. In this way, it is possible to warn a delivery user who is going to carry away luggage not to carry away luggage.

In the process of (3), the alarm processing unit 4024 transmits the carrying-away signal to the request user terminal 50 via the communication unit 401. When the communication unit 51 of the request user terminal 50 receives the carrying-away signal, the control unit 52 displays a notification about carrying-away of luggage on the input and output unit 53. In addition to the touch panel display, means that gives a notification about carrying-away of luggage by sound or vibration may be provided in the input and output unit 53. In this way, it is possible to give a notification about carrying-away of luggage to a request user who carries the request user terminal 50. The alarm processing unit 4024 may transmit a reference image and a comparison image along with the carrying-away signal to the request user terminal 50. The reference image and the comparison image may be displayed on the touch panel display.

Figure 14:
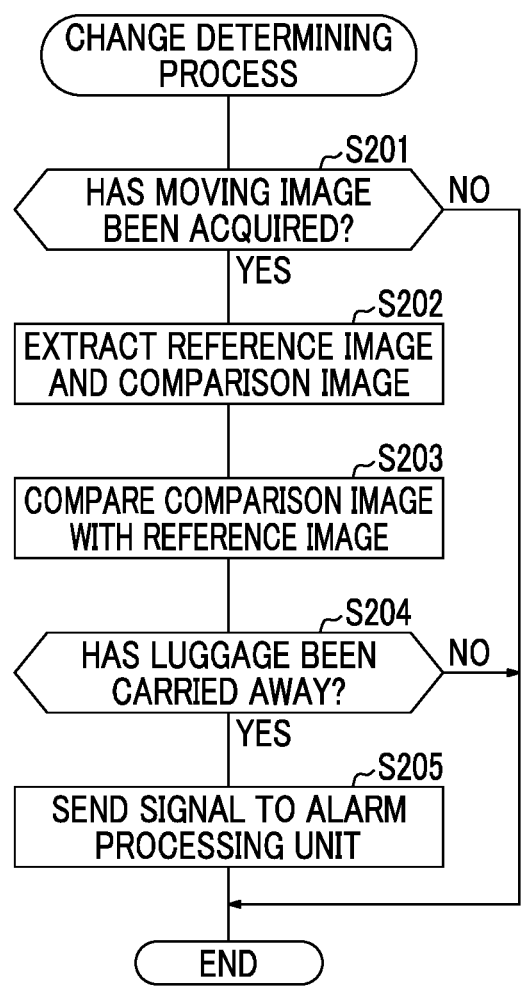
FIG. 14 is a flowchart illustrating a process flow in a central server when it is determined whether luggage has been carried away.

FIG. 14 is a flowchart illustrating a flow of the change determining process which is performed by the central server 400 when it is determined whether luggage has been carried away. In this embodiment, the change determining process is performed by the central server 400.

In Step S201, the change determination processing unit 4023 determines whether a moving image is stored in the image storage unit 405. When the determination result of Step S201 is negative, the process flow ends. On the other hand, when the determination result of Step S201 is positive, the change determination processing unit 4023 extracts a reference image and a comparison image from the moving image stored in the image storage unit 405 in Step S202. When the reference image and the comparison image are transmitted from the onboard unit 10A to the central server 400, the change determination processing unit 4023 determines whether a reference image and a comparison image are stored in the image storage unit 405 in Step S201, and skips Step S202. The change determination processing unit 4023 compares the reference image with the comparison image in Step S203, and determines whether luggage has been carried away in Step S204. When the determination result of Step S204 is negative, the process flow ends. On the other hand, when the determination result of Step S204 is positive, the change determination processing unit 4023 transmits a carrying-away signal to the alarm processing unit 4024 in Step S205, and then the process flow ends. The alarm processing unit 4024 having received the carrying-away signal from the change determination processing unit 4023 performs a predetermined notification process.

Figure 15:
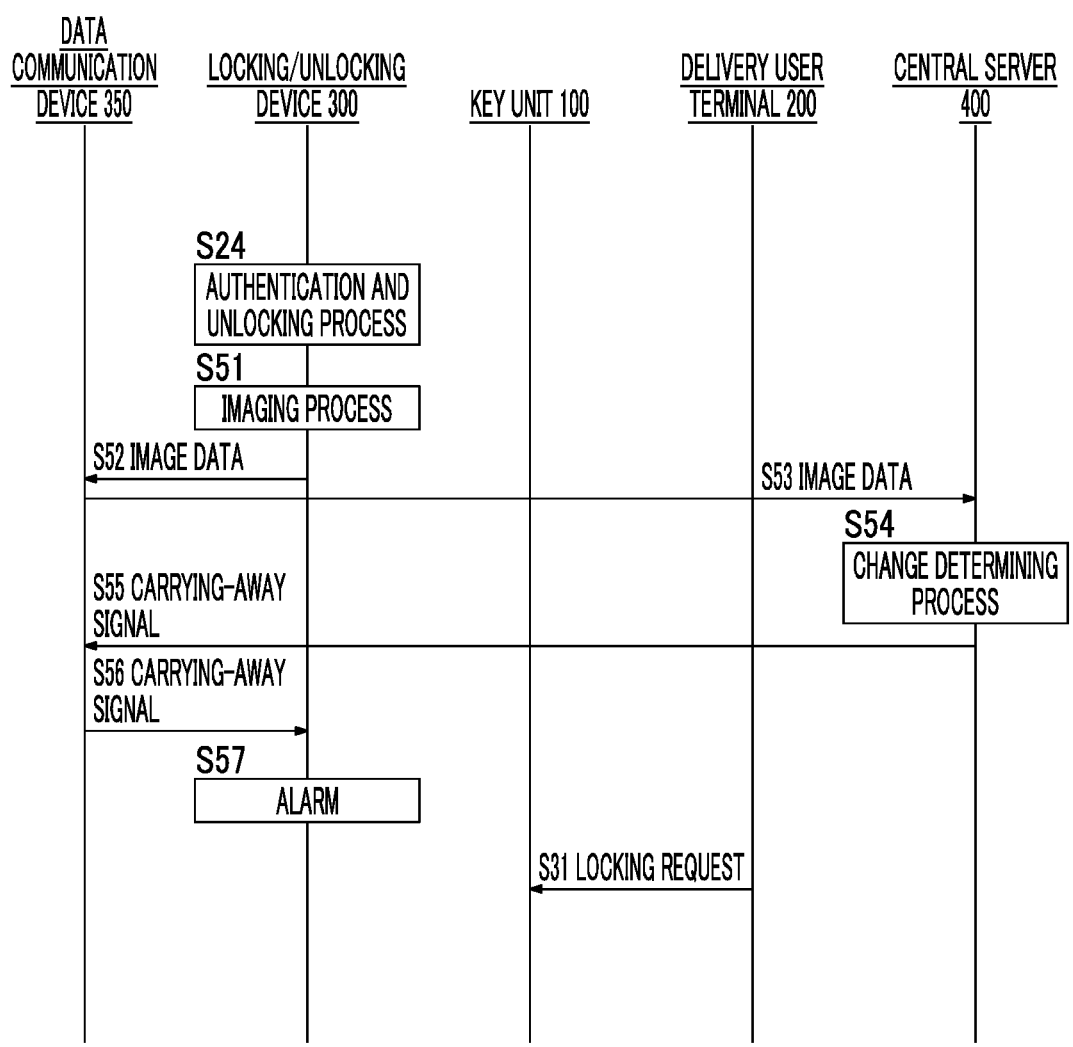
FIG. 15 is a diagram illustrating a flow of operations in the luggage management system when a change determination processing unit determines that luggage has been carried away.

The operation of the luggage management system 1 when the change determination processing unit 4023 determines that luggage has been carried away in this way will be described below with reference to FIG. 15. The processes of Steps S11 to S13, Steps S21 to S24, and Steps S31 to S38 are the same as in the process flow illustrated in FIG. 9, thus description thereof will not be repeated, and some thereof is not illustrated.

After the cargo compartment 15 of the vehicle 10 has been unlocked in Step S24, an imaging process is performed. That is, until the cargo compartment door 16 is closed after a delivery user has opened the cargo compartment door 16, the locking/unlocking device 300 causes the imaging device 11 to capture a moving image. When the cargo compartment door 16 is closed and capturing of a moving image ends, the locking/unlocking device 300 stores the moving image in the image storage unit 12 (the process of Step S51). Then, image data is transmitted from the locking/unlocking device 300 to the data communication device 350 (the process of Step S52), and the image data is transmitted from the data communication device 350 to the central server 400 (the process of Step S53). When the central server 400 receives the image data and stores the image data in the image storage unit 405, a change determining process (the process flow illustrated in FIG. 14) is performed by the central server 400 (the process of Step S54). When the central server 400 determines that luggage has been carried away through the change determining process, the central server 400 transmits a carrying-away signal to the data communication device 350 (the process of Step S55), and the carrying-away signal is transmitted from the data communication device 350 to the locking/unlocking device 300 (the process of Step S56). Then, the locking/unlocking device 300 gives a notification about carrying-away of luggage by sound or the like (the process of Step S57). In Step S57, the notification process of (1) is performed.

As described above, according to this embodiment, in the luggage management system 1 in which a cargo compartment 15 of a vehicle 10 is used as a pickup and delivery place of luggage, when luggage has been carried away, the central server 400 detects that luggage has been carried away and thus it is possible to contribute to improvement in security.

In this embodiment, a period in which a one-time key is valid may be notified from the central server 400 to the onboard unit 10A, and a moving image may be captured with a start time point of the period as the first time and an end time point of the period as the second time.

When the alarm processing unit 4024 receives the carrying-away signal, the alarm processing unit 4024 may take measures other than described above. These measures include a notification to the police, a manager who manages the delivery management server 500, a manager who manages the central server 400, and the like. In this case, this function is provided in the delivery management server 500 or the central server 400. For example, when the alarm processing unit 4024 of the central server 400 has received a carrying-away signal, the carrying-away signal may be transmitted to the delivery management server 500 via the communication unit 401. When the communication unit 501 of the delivery management server 500 receives the carrying-away signal, the control unit 502 of the delivery management server 500 may perform a notification process.

In this embodiment, the central server 400 performs the change determining process, but the same function may be provided in the delivery management server 500 or the request user terminal 50. A function of storing an image may be provided in the delivery management server 500 or the request user terminal 50. That is, the delivery management server 500 or the request user terminal 50 may include an image storage unit that stores image data, a change determination processing unit that performs the change determining process, and an alarm processing unit that gives a notification when it is determined that luggage has been carried away. For example, image data transmitted from the data communication device 350 of the onboard unit 10A may be received by the communication unit 501 of the delivery management server 500 or the communication unit 51 of the request user terminal 50.

When the onboard unit 10A performs the change determining process as in the first embodiment and it is determined that luggage has been carried away, a carrying-away signal may be transmitted to the central server 400 via the data communication device 350 and the alarm processing unit 4024 of the central server 400 may perform a predetermined notification process. In this case, the change determination processing unit 4023 does not need to be provided in the central server 400, and the locking/unlocking device 300 includes the change determination processing unit 3042.

MODIFIED EXAMPLE 1 OF SECOND EMBODIMENT

When it is determined through the change determining process that luggage has been carried away, the change determination processing unit 4023 of the central server 400 stores a reference image and a comparison image in the image storage unit 405, but may not send a signal indicating the state to the alarm processing unit 4024. Even when luggage has been carried away, a notification is not given at that time and a reference image and a comparison image are merely stored in the image storage unit 405. In this case, the alarm processing unit 4024 does not need to be provided. Thereafter, in response to a request from a request user, the police, a manager who manages the delivery management server 500, a manager who manages the central server 400, or the like, the reference image and the comparison image are displayed. The central server 400 may be configured such that a display for displaying the reference image and the comparison image can be connected to the central server 400. By storing image data in the image storage unit 405 of the central server 400 or in an image storage unit (not illustrated) of the delivery management server 500, it is possible to store evidence for carrying-away of luggage. The central server 400 may transmit the reference image and the comparison image to the request user terminal 50 in response to a request from the request user terminal 50.

Image data may be stored in the image storage unit 405 of the central server 400 or the image storage unit 12 of the onboard unit 10A and the change determining process may be performed when a request from a request user or the like is received. That is, when a request user or the like suspects that luggage has been carried away, the change determining process may be performed and it may be determined whether luggage has been carried away. This request is issued by allowing a request user to operate the input and output unit 53 of the request user terminal 50. For example, a request user issues the request by clicking a predetermined icon displayed on a touch panel display of the request user terminal 50. This request is transmitted to the onboard unit 10A or the central server 400 via the communication unit 51. The central server 400 or the onboard unit 10A performs the change determining process by comparing the reference image and the comparison image. Similarly, a function of storing image data may be provided in the delivery management server 500 or the request user terminal 50 and image data may be stored therein. The determination result of the change determining process may be transmitted from the onboard unit 10A or the central server 400 to the request user terminal 50, and the determination result may be displayed on a touch panel display.

Third Embodiment

A third embodiment will be described below based on the luggage management system 1 illustrated in FIGS. 12 and 13. This embodiment can be similarly applied to the luggage management system 1 illustrated in FIGS. 1 and 2. In this embodiment, a comparison image at the time of previous delivery is set as a reference image at the time of current delivery. That is, it is assumed that the state in the cargo compartment 15 has not changed from a time point corresponding to the second time in the previous delivery to a time point corresponding to the first time in the current delivery, and an image captured at the second time in the previous delivery is used as a reference image in the current delivery. In this case, only a still image may be captured at the second time, or a moving image from the first time to the second time may be captured similarly to the above-mentioned embodiment, the captured moving image may be stored at least in the image storage unit 12, then a still image at the second time may be extracted from the moving image, and a still image at the time point corresponding to the first time may not be extracted. The conditions in the change determining process can be considered as the same as in the above-mentioned embodiment. Accordingly, it is possible to simplify the processes.

For example, in Step S202 in the flowchart illustrated in FIG. 14, the change determination processing unit 4023 extracts only a comparison image from a moving image stored in the image storage unit 405 and stores the extracted comparison image in the image storage unit 405, instead of extracting a reference image and a comparison image from the moving image. In Step S203, the change determination processing unit 4023 compares a comparison image stored in the image storage unit 405 in the previous change determining process as a reference image in the current change determining process with the comparison image stored in the image storage unit 405 in the current change determining process. When the comparison of Step S203 is completed, the change determination processing unit 4023 adds information indicating a next reference image to the comparison image in the current change determining process and stores the image in the image storage unit 405. When the change determining process is performed at the first time, when a reference image which will be described later is reset, or the like, there is no reference image. Accordingly, in this case, the reference image may be acquired in the same way as in the second embodiment.

MODIFIED EXAMPLE 1 OF THIRD EMBODIMENT

Between the previous delivery and the current delivery, a request user may take out existing luggage from the cargo compartment 15. In this case, a comparison image at the time of previous delivery cannot be set as a reference image at the time of current delivery. A case in which a cargo compartment door 16 of a vehicle 10 is opened or closed by a request user between the previous delivery and the current delivery will be described below. When existing luggage is taken out by a request user, the state in the cargo compartment 15 at a time point corresponding to the second time in the previous delivery and the state in the cargo compartment 15 at a time point corresponding to the first time in the current delivery are different from each other, and thus the comparison image in the previous delivery cannot be said to represent the state in the cargo compartment 15 when the cargo compartment 15 has been unlocked or the cargo compartment door 16 has been opened in the current delivery.

Therefore, in this modified example, it is inquired of a request user about whether luggage has been taken out when the cargo compartment door 16 is opened or closed by the request user, and an image captured at the first time in subsequent delivery is set as a reference image when a response indicating that luggage has been taken out is returned from the request user. On the other hand, when a response indicating that luggage has not been taken out is returned, the comparison image in the previous delivery is used as a reference image in subsequent delivery.

Authentication information stored in the request user terminal 50 is different from authentication information transmitted to the delivery user terminal 200. Accordingly, when a locking/unlocking request is received, the authentication unit 1042 of the key unit 100 can determine whether the locking/unlocking request has been issued from the request user terminal 50 or from the delivery user terminal 200. A key ID transmitted from the key unit 100 to the locking/unlocking device 300 along with a locking/unlocking signal differs between when a locking/unlocking request is transmitted from the delivery user terminal 200 and when a locking/unlocking request is transmitted from the request user terminal 50. Accordingly, when a locking/unlocking is received, the locking/unlocking device 300 can determine whether the locking/unlocking has been received from the request user terminal 50 or from the delivery user terminal 200.

When a locking/unlocking request is transmitted from the request user terminal 50, the body ECU 304 transmits a signal indicating that a locking/unlocking request has been received from the request user terminal 50 to the central server 400 via the data communication device 350. The change determination processing unit 4023 of the central server 400 having received the signal transmits a signal for inquiring about whether luggage has been taken out (hereinafter also referred to as an inquiry signal) to the request user terminal 50 via the communication unit 401. When the communication unit 51 of the request user terminal 50 receives the inquiry signal, the control unit 52 displays an image indicating whether luggage has been taken out on the input and output unit 53. For example, an icon indicating that luggage has been taken out and an icon indicating that luggage has not been taken out are displayed on a touch panel display, and a sentence for promoting a request user to click one icon is displayed on the touch panel display. When the request user operates the input and output unit 53 to input a response to the inquiry, the control unit 52 transmits the response to the central server 400 via the communication unit 51. When a response indicating that luggage has been taken out is returned from the request user terminal 50, the change determination processing unit 4023 of the central server 400 resets (deletes) the comparison image in the previous delivery stored in the image storage unit 405. The inquiry signal may be transmitted from the locking/unlocking device 300 to the request user terminal 50. In this case, when a locking/unlocking request is received from the request user terminal 50, the body ECU 304 transmits a signal for inquiring about whether luggage has been taken out to the request user terminal 50 via the data communication device 350. A response input by allowing the request user to operate the input and output unit 53 is transmitted to the data communication device 350 via the communication unit 51 by the control unit 52. Based on the response, the body ECU 304 resets the comparison image in the previous delivery stored in the image storage unit 12. Thereafter, the imaging device may be caused to capture a new image and the captured image may be stored.

Figure 16:
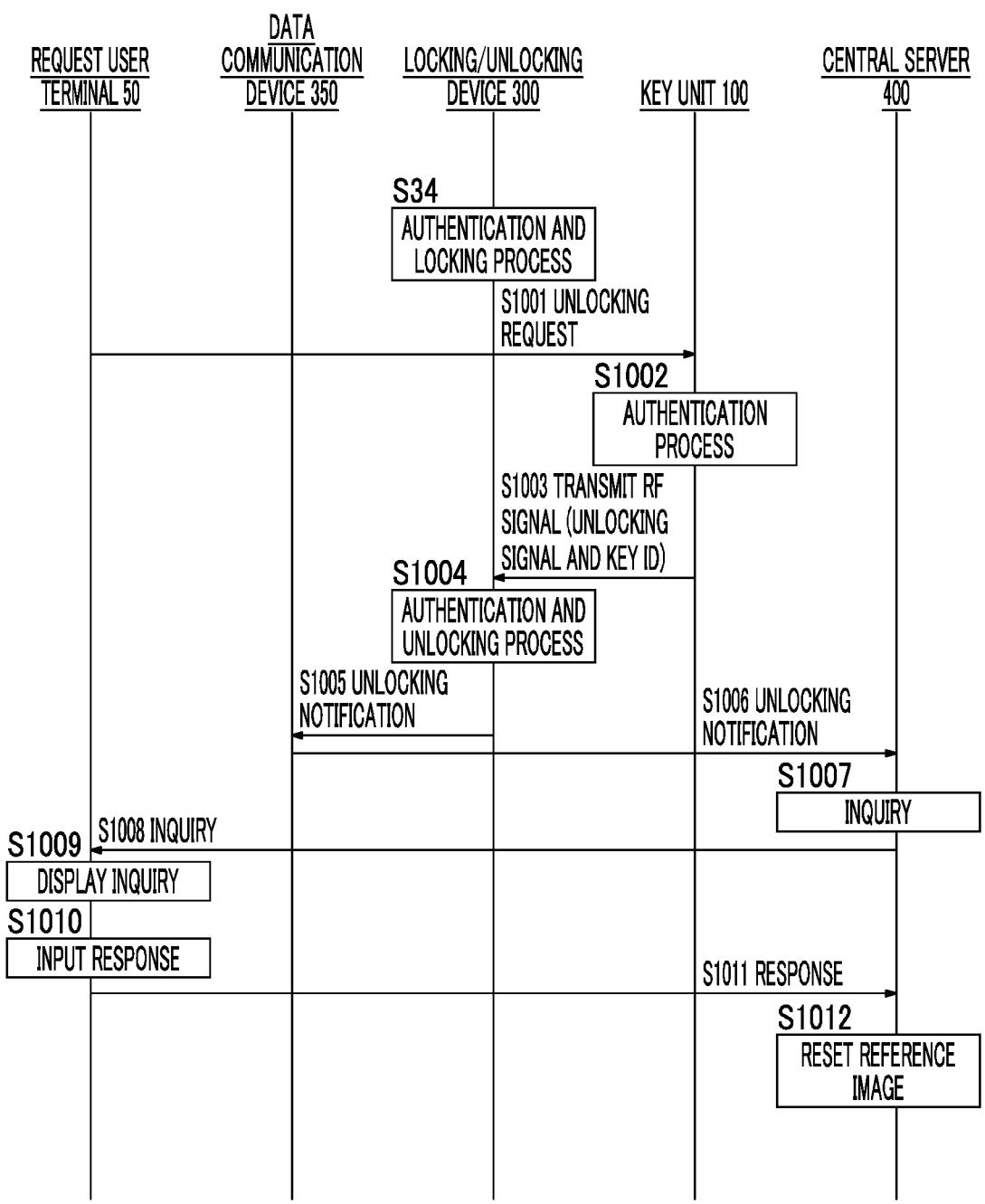
FIG. 16 is a diagram illustrating a flow of operations in the luggage management system when a response indicating that luggage has been taken out is received from a request user.

The operation of the luggage management system 1 when a request user has returned a response indicating that luggage has been taken out will be described below with reference to FIG. 16. In Steps S1001 to S1004 illustrated in FIG. 16, a process for unlocking a cargo compartment 15 of a vehicle 10 is performed using a request user terminal 50. In performing the processes of Steps S1001 to S1004, it is assumed that the request user terminal 50 is moved to a position at which short-range radio communication between the key unit 100 of the vehicle 10 and the request user terminal 50 is set up by the request user.

When the request user performs an operation of unlocking the vehicle 10 via the input and output unit 53 of the request user terminal 50, the request user terminal 50 transmits an unlocking request including authentication information to the key unit 100 in Step S1001. Then, when the unlocking request transmitted from the request user terminal 50 is received by the key unit 100, the key unit 100 performs an authentication process by comparing the authentication information (terminal authentication information) included in the unlocking request with the authentication information (device authentication information) stored in the storage unit 1041 in Step S1002. When the authentication using both pieces of authentication information has succeeded, the key unit 100 transmits an unlocking signal and a key ID to the locking/unlocking device 300 in Step S1003. When the unlocking signal and the key ID transmitted from the key unit 100 is received by the locking/unlocking device 300, the locking/unlocking device 300 performs an authentication process based on the received key ID in Step S1004. When the authentication has succeeded, the cargo compartment 15 of the vehicle 10 is unlocked.

When the cargo compartment 15 of the vehicle 10 is unlocked, the locking/unlocking device 300 transmits a signal for notifying of unlocking (hereinafter also referred to as an unlocking notification) to the central server 400 via the data communication device 350. The central server 400 having received the unlocking notification inquires of the request user about whether luggage has been taken out (the process of Step S1007). The signal for inquiry is transmitted from the central server 400 to the request user terminal 50 (the process of Step S1008) and the request user terminal 50 having received the signal of inquiry displays an image for promoting the request user to return a response indicating whether luggage has been taken out on the touch panel display (the process of Step S1009). When a response to the inquiry is input (the process of Step S1010), a signal based on the response is transmitted from the request user terminal 50 to the central server 400 (the process of Step S1011). Then, when the central server 400 receives a response indicating that luggage has been taken out, the reference image stored in the central server 400 (a previous comparison image) is reset. The time at which a new reference image is captured may be a time point corresponding to the first time in the current delivery or may be any time before a time point corresponding to the first time in the subsequent or current delivery at which the request user operates the input and output unit 53 to input the response. That is, an image replacing the previous comparison image may be captured at any time between a time point at which a response has been returned from the request user terminal and a time point corresponding to an unlocking-associated time.

As described above, according to this embodiment, since a previous comparison image can be used as a current reference image, it is possible to simplify the change determining process. When the request user has taken out luggage from the cargo compartment 15, a current reference image is newly captured and thus it is possible to curb a decrease in accuracy when it is determined whether luggage has been carried away from the cargo compartment 15.

Fourth Embodiment

A fourth embodiment will be described below based on the luggage management system 1 illustrated in FIGS. 12 and 13. In this embodiment, whether luggage has been carried away from a cargo compartment 15 is determined by a delivery company that uses the delivery management server 500 or a request user who uses the request user terminal 50. The delivery company mentioned herein is a user who monitors whether a delivery user correctly performs delivery, unlike the delivery user who uses the delivery user terminal 200. This user is also referred to as a delivery management user.

Figure 17:
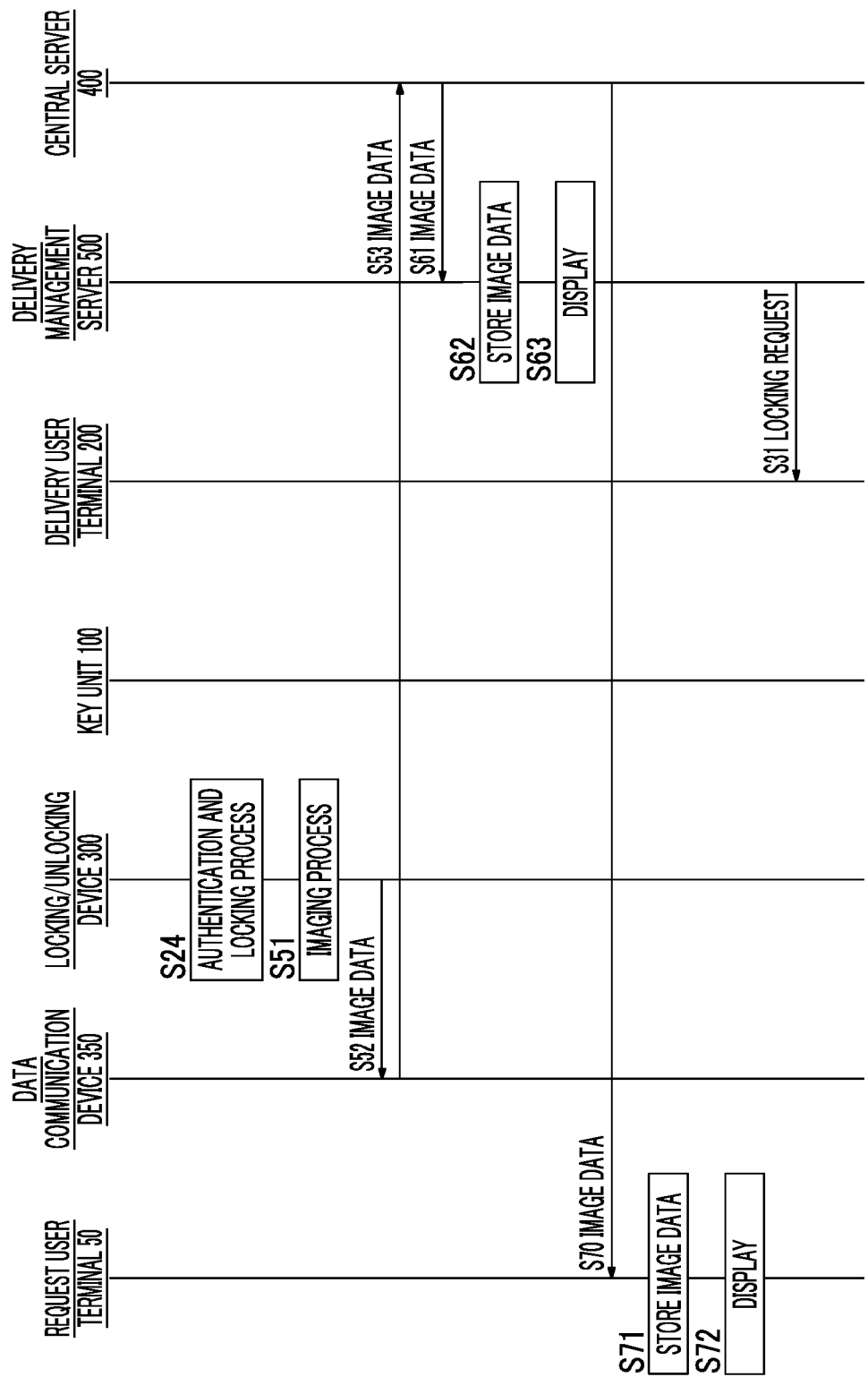
FIG. 17 is a diagram illustrating a flow of operations in the luggage management system when a delivery management user or a request user ascertains whether luggage has been carried away.

The operation of the luggage management system 1 when the delivery management user or the request user ascertains whether luggage has been carried away in this way will be described below with reference to FIG. 17. The processes of Steps S11 to S13, Steps S21 to S24, and Steps S31 to S38 are the same as in the process flow illustrated in FIG. 9, the processes of Steps S51 to S53 are the same as in the process flow illustrated in FIG. 15, thus description thereof will not be repeated, and some thereof is not illustrated. When the central server 400 receives image data in Step S53, the central server 400 transmits the received image data to the delivery management server 500 (the process of Step S61). The delivery management server 500 having received image data stores the image data in a storage unit (not illustrated) of the delivery management server 500 (the process of Step S62). The delivery management server 500 displays the image data on a display (not illustrated) of the delivery management server 500 in response to a request from the delivery management user (the process of Step S63). The display may be, for example, a display which is included in a person computer or a mobile terminal connected to the delivery management server 500 via the network N1.

The central server 400 may transmit image data to the delivery management server 500 only when a request has been received from the delivery management server 500. Similarly, the locking/unlocking device 300 may transmit image data to the central server 400 only when a request has been received from the central server 400. The delivery management user can ascertain whether a delivery user correctly performs delivery by seeing an image displayed on the display in the process of Step S63.

The central server 400 may transmit image data received via the data communication device 350 to the request user terminal 50 (the process of Step S70). The request user terminal 50 having received the image data stores the image data in a storage unit (not illustrated) of the request user terminal 50 (the process of Step S71). The image data is displayed on the input and output unit 53 of the request user terminal 50 in response to a request from the request user (the process of Step S72). The request user can determine whether luggage has been carried away by seeing the image. The central server 400 may transmit the image data to the request user terminal 50 only when a request has been received from the request user terminal 50. One side of the processes of Steps S61 to S63 and the processes of Steps S70 to S72 may be performed or both sides thereof may be performed. The image data which is transmitted in Steps S52, S53, S61, and S70 may include only the reference image and the comparison image, include a moving image in addition to the reference image and the comparison image, or include only a moving image.

According to this embodiment, since the delivery management user or the request user determines whether luggage has been carried away from the cargo compartment 15, the change determination processing unit does not need to be provided in the central server 400 or the locking/unlocking device 300. Accordingly, it is possible to simplify the luggage management system 1. Since image data is stored in one or more of the onboard unit 10A, the central server 400, the delivery management server 500, and the request user terminal 50, evidence for carrying-away can be left even when luggage has been carried away.

Fifth Embodiment

A fifth embodiment will be described below based on the luggage management system 1 illustrated in FIGS. 12 and 13. In this embodiment, the central server 400 performs the change determining process. When the central server 400 determines that luggage has been carried away, image data and a carrying-away signal are transmitted to the request user terminal 50. The request user terminal 50 gives a notification to the request user.

Figure 18:
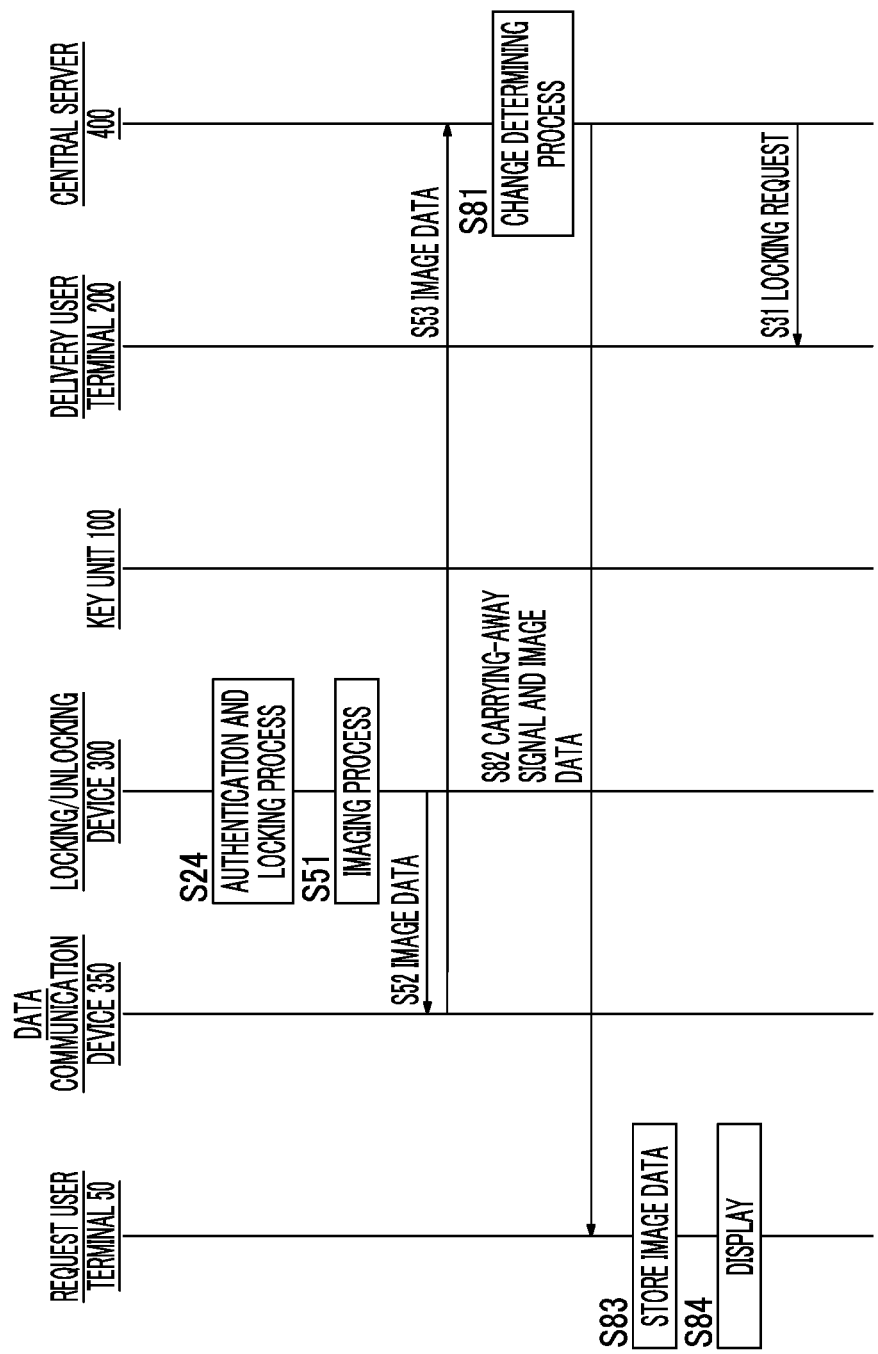
FIG. 18 is a diagram illustrating a flow of operations in the luggage management system when a request user terminal gives a notification to a request user.

The operation of the luggage management system 1 when the request user terminal 50 gives a notification to the request user in this way will be described below with reference to FIG. 18. The processes of Steps S11 to S13, Steps S21 to S24, and Steps S31 to S38 are the same as in the process flow illustrated in FIG. 9, thus description thereof will not be repeated, and some thereof is not illustrated. The processes of Steps S51 to S53 are the same as in the process flow illustrated in FIG. 17 and thus description thereof will not be repeated. When the central server 400 receives image data transmitted from the data communication device 350 and the image data is stored in the image storage unit 405, the central server 400 performs the change determining process (the process flow illustrated in FIG. 14) (the process of Step S81). Then, when it is determined through the change determining process that luggage has been carried away, a carrying-away signal and image data are transmitted from the central server 400 to the request user terminal 50 (the process of Step S82). The request user terminal 50 having received the carrying-away signal and the image data stores the image data in a storage unit (not illustrated) of the request user terminal 50 (the process of Step S83) and gives a notification to the request user by displaying a notification indicating that luggage has been carried away on the display of the request user terminal 50 (the process of Step S84). In the process of Step S84, the request user terminal 50 may additionally display a reference image and a comparison image on the display.

According to this embodiment, the central server 400 can determine whether luggage has been carried away from the cargo compartment 15, and a notification can be rapidly given to a request user when luggage has been carried away. Accordingly, it is possible to promote a request user to ascertain luggage.

Sixth Embodiment

Figure 19:
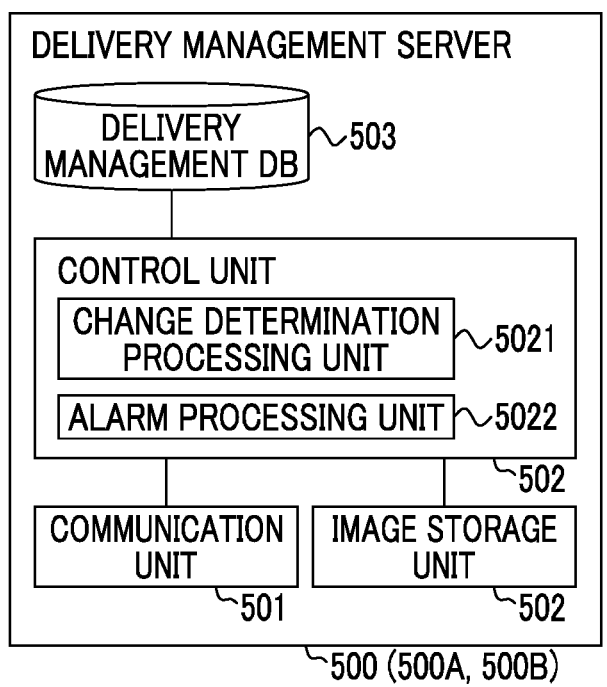
FIG. 19 is a block diagram schematically illustrating an example of a configuration of a delivery management server.
Figure 20:
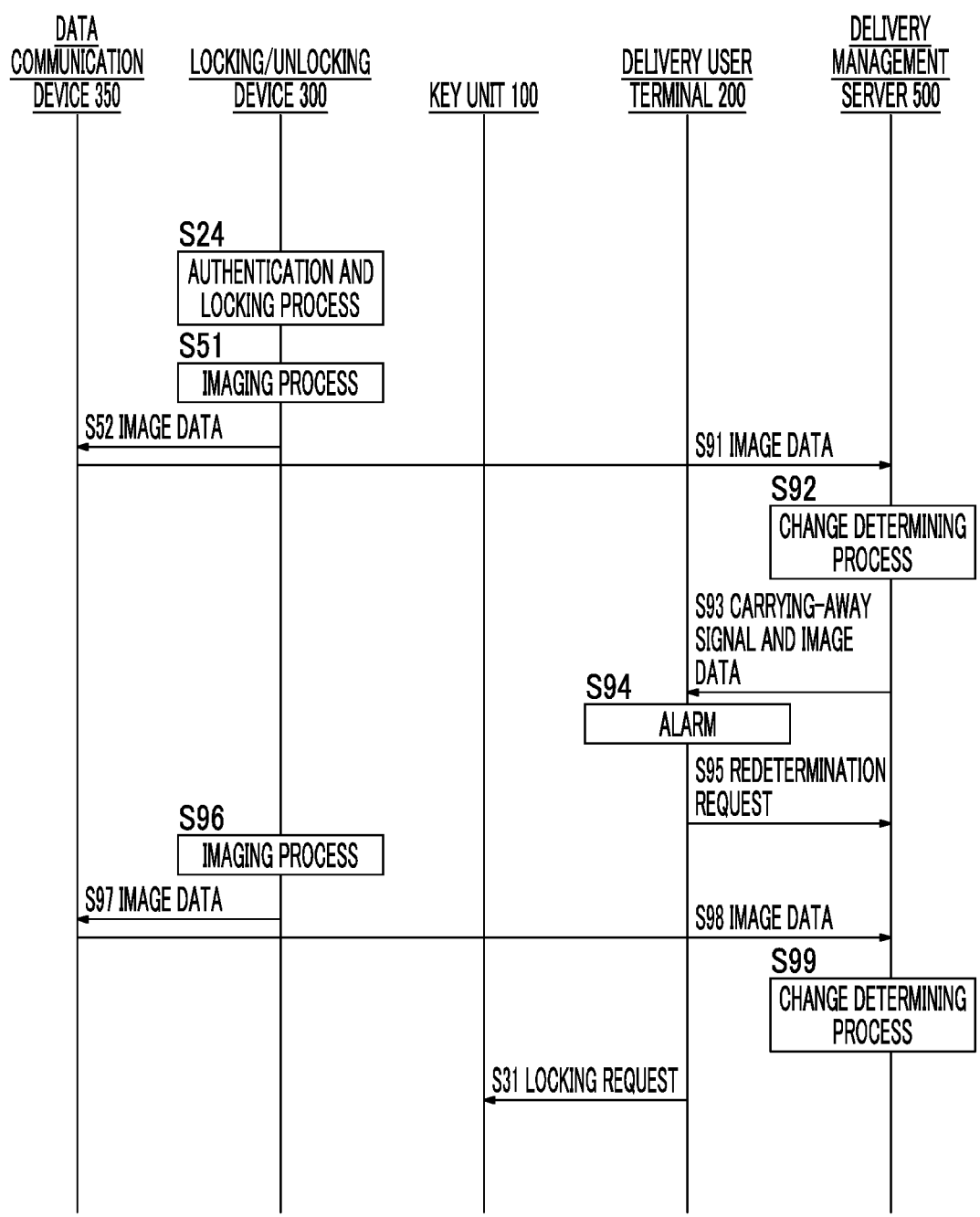
FIG. 20 is a diagram illustrating a flow of operations in the luggage management system when a delivery user terminal gives a notification to a delivery user.

A sixth embodiment will be described below based on the luggage management system 1 illustrated in FIGS. 12 and 13. In this embodiment, the delivery management server 500 performs the change determining process and transmits a carrying-away signal to the delivery user terminal 200 when it is determined that luggage has been carried away. Then, the delivery user terminal 200 gives an alarm to the delivery user. FIG. 19 is a block diagram schematically illustrating an example of a configuration of the delivery management server 500. The control unit 502 of the delivery management server 500 includes a change determination processing unit 5021 that performs a change determining process in the same way as the change determination processing unit 4023 of the central server 400 illustrated in FIG. 13 and an alarm processing unit 5022 that performs a predetermined alarming process in the same way as the alarm processing unit 4024 of the central server 400 illustrated in FIG. 13. The delivery management server 500 includes an image storage unit 504 that stores image data in the same way as the image storage unit 405 of the central server 400 illustrated in FIG. 13. The central server 400 according to this embodiment does not need to include the change determination processing unit 4023, the alarm processing unit 4024, and the image storage unit 405.

The operation of the luggage management system 1 when the delivery user terminal 200 gives a notification to the delivery user will be described below with reference to FIG.

20. The processes of Steps S11 to S13, Steps S21 to S24, and Steps S31 to S38 are the same as in the process flow illustrated in FIG. 9, thus description thereof will not be repeated, and some thereof is not illustrated. The processes of Steps S51 to S52 are the same as the process flow illustrated in FIG. 17 and thus description thereof will not be repeated. The data communication device 350 transmits image data to the delivery management server 500 (the process of Step S91). The image data may be transmitted to the delivery management server 500 via the central server 400. When the communication unit 501 of the delivery management server 500 receives the image data transmitted from the data communication device 350, the control unit 502 stores the image data in the image storage unit 504 of the delivery management server 500. When the image data is stored in the image storage unit 504, the control unit 502 of the delivery management server 500 performs a change determining process (the process of Step S92). In the change determining process, the change determination processing unit 4023 of the central server 400 in the process flow illustrated in FIG. 14 can be replaced with the change determination processing unit 5021, the alarm processing unit 4024 of the central server 400 can be replaced with the alarm processing unit 5022, and the image storage unit 405 of the central server 400 can be replaced with the image storage unit 504. When the change determination processing unit 5021 determines that luggage has been carried away through the change determining process, the alarm processing unit 5022 performs a predetermined notification process. Through the predetermined notification process, a carrying-away signal is transmitted from the delivery management server 500 to the delivery user terminal 200 (the process of Step S93). The delivery user terminal 200 having received the carrying-away signal informs of the delivery user by displaying a notification indicating that luggage has been carried away on a touch panel display of the delivery user terminal 200 (the process of Step S94).

Here, erroneous determination may be performed in the change determining process. That is, the delivery user has not carried away luggage but it may be determined that luggage has been carried away. Examples of this case include a case in which existing luggage does not appear in a comparison image or a case in which currently delivered luggage does not appear in the comparison image. For example, when existing luggage is arranged at a dead angle of currently delivered luggage, erroneous determination may be performed. In this case, the delivery user may perform adjustment such that all pieces of luggage are imaged by the imaging device 11 by opening the cargo compartment door 16 again and moving positions of the pieces of luggage. Thereafter, a comparison image may be acquired again and the change determining process may be performed again. In this case, the delivery user operates the delivery user terminal 200 to request the delivery management server 500 to perform the change determining process again. That is, when the delivery user clicks a predetermined icon displayed on the input and output unit 204 of the delivery user terminal 200 with the alarm, the control unit 203 transmits a signal indicating a request for performing the change determining process again to the delivery management server 500 via the communication unit 202 (the process of Step S95). The delivery user opens the cargo compartment door 16 again and moves the luggage. With this operation, the locking/unlocking device 300 captures a moving image again (the process of Step S96). In Step S96, the same process as in Step S51 is performed. Newly acquired image data is transmitted to the delivery management server 500 via the data communication device 350 (the process of Steps S97 and S98). When the communication unit 501 of the delivery management server 500 receives the image data transmitted from the data communication device 350, the control unit 502 stores the image data in the image storage unit 504 of the delivery management server 500. The delivery management server 500 performs the change determining process again. In this change determining process, an image captured when the cargo compartment door 16 is opened or closed in the previous delivery in Step S203 in the process flow illustrated in FIG. 14, that is, at the first time in the process of Step S51, is set as a reference image, and an image captured when the cargo compartment door 16 is opened or closed in the current delivery, that is, at the second time in the process of Step S96, is set as a comparison image.

According to this embodiment, as described above, the delivery management server 500 determines whether luggage has been carried away from the cargo compartment 15, and a notification is rapidly given to a delivery user when luggage has been carried away. The delivery user having received the alarm can correct erroneous determination in the change determining process by adjusting a position of luggage and then requesting the change determining process again.

Seventh Embodiment

Figure 21:
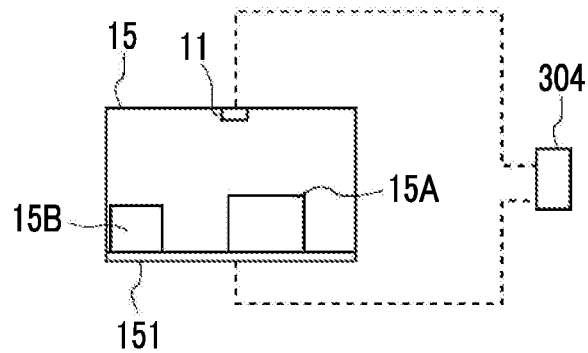
FIG. 21 is a diagram schematically illustrating a configuration of a sheet.

A seventh embodiment will be described below based on the luggage management system 1 illustrated in FIGS. 12 and 13. This embodiment can be similarly applied to the luggage management system 1 illustrated in FIGS. 1 and 2. In this embodiment, a sheet 151 that detects a mass of luggage is provided on a bottom surface of the cargo compartment 15, and determination is performed in consideration of change in mass of luggage in the cargo compartment 15 in addition to comparison between the reference image and the comparison image (hereinafter simply referred to as comparison between images) described above in the embodiments when it is determined whether luggage has been carried away. FIG. 21 is a diagram schematically illustrating a configuration of a sheet 151. In FIG. 21, first luggage 15A is luggage which is accommodated by a delivery user A (existing luggage) and second luggage 15B is luggage which is accommodated by a delivery user B.

The sheet 151 is laid on the entire bottom surface of the cargo compartment 15 and detects a pressure applied to the sheet for each predetermined area. Accordingly, an area in which luggage is disposed, a size of luggage, and a mass of luggage can be detected for each piece of luggage. The sheet 151 transmits a signal corresponding to an area in which luggage is disposed, a size of luggage, and a mass of luggage to the body ECU 304. Accordingly, the body ECU 304 can ascertain the number of pieces, the size, and the mass of luggage which is accommodated in the cargo compartment 15. In this embodiment, since a mass of luggage has only to be detected, for example, change in height of a vehicle 10 may be detected by a sensor or the like and a mass of luggage may be detected based on the change in height of the vehicle 10 instead of using the sheet 151. This sensor may detect the change in height of the vehicle 10 by detecting change in an amount of depression of a suspension. In this embodiment, the sheet 151 serves as a mass detecting unit in the claims.

When the second luggage 15B is disposed in a state in which the first luggage 15A is disposed, the total mass of luggage in the cargo compartment 15 increases by the mass of the second luggage 15B. Accordingly, when an increase corresponding to the mass of the second luggage 15B is not detected between the first time and the second time, it can be thought that carrying-away of luggage has occurred. On the other hand, when an increase corresponding to the mass of the second luggage 15B is detected, it can be thought that carrying-away of luggage has not occurred. Since it is also conceivable that a delivery user disposes luggage having the same mass instead of the second luggage 15B, determination of whether luggage has been carried away is performed in consideration of a result of comparison between images in addition to a result of comparison between masses.

Information of a mass of luggage is included in delivery information which is stored in the delivery management DB 503 of the delivery management server 500. A mass of luggage is measured by a request user or a delivery company and is input as attribute information to the field of luggage attributes illustrated in FIG. 5. For example, when the delivery management server 500 receives registration of luggage from a request user terminal 50, the information of a mass of luggage is transmitted from the request user terminal 50 to the delivery management server 500. In this embodiment, the delivery management DB 503 serves as a mass acquiring unit in the claims. The change determination processing unit 4023 of the central server 400 compares the mass of luggage stored in the delivery management DB 503 with an increase in the total mass of luggage in the cargo compartment 15 which is detected by the sheet 151, determines that luggage has not been carried away when there is no difference therebetween or when there is a difference therebetween but the difference is within an error range, and determines that luggage has been carried away when there is a difference therebetween or when the difference is out of the error range. When the comparison result in image and the comparison result in mass are equal, the change determination processing unit 4023 employs the comparison result. That is, the change determination processing unit 4023 determines that luggage has been carried away based on the comparison result in image, and transmits a carrying-away signal to the alarm processing unit 4024 only when it is determined that luggage has been carried away based on the comparison result in mass. When the comparison result in image and the comparison result in mass are different, the change determination processing unit 4023 may transmit a signal indicating the difference to the alarm processing unit 4024, and the alarm processing unit 4024 may perform a notification process based on the signal.

Figure 22:
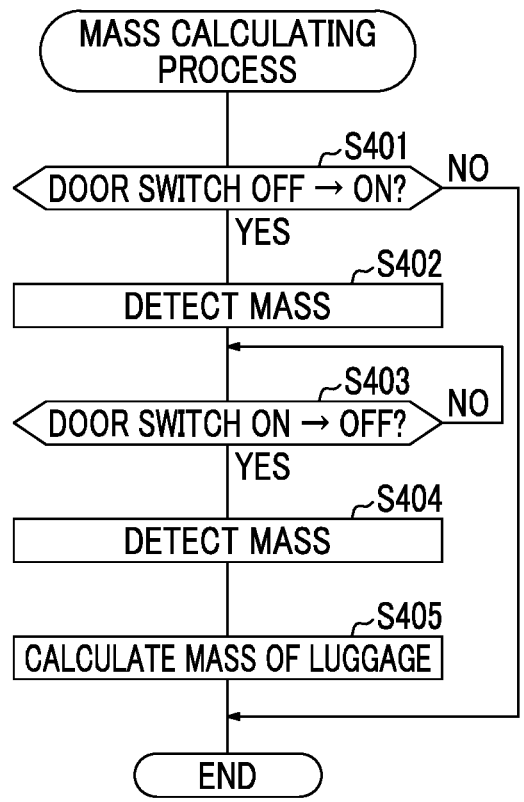
FIG. 22 is a flowchart illustrating a process flow of detecting a mass of luggage to determine whether luggage has been carried away.

FIG. 22 is a flowchart illustrating a process flow of detecting a mass of luggage for determining whether luggage has been carried away. This process flow is performed in parallel with an imaging process. In the following description, a process of calculating a mass of luggage for determining whether luggage has been carried away is also referred to as a mass calculating process. In Step S401, the body ECU 304 determines whether a signal from the door switch 306 has changed from the OFF state to the ON state. In Step S401, the body ECU 304 determines whether it is a time to detect a mass of luggage using the sheet 151. When the determination result of Step S401 is negative, the process flow ends. On the other hand, when the determination result of Step S401 is positive, the body ECU 304 detects a mass of luggage by controlling the sheet 151 in Step S402. The mass which is detected at this time is a total mass of luggage in the cargo compartment 15. The mass of luggage is stored in a storage unit (not illustrated) by the body ECU 304. Then, in Step S403, the body ECU 304 determines whether the signal from the door switch 306 has changed from the ON state to the OFF state. In Step S403, the body ECU 304 determines whether it is a time to detect a mass of luggage using the sheet 151. When the determination result of Step S403 is negative, the process of Step S403 is performed again. On the other hand, when the determination result of Step S403 is positive, the body ECU 304 detects a mass of luggage by controlling the sheet 151 in Step S404. The mass which is detected at this time is a total mass of luggage in the cargo compartment 15. The mass of luggage is stored in a storage unit (not illustrated) by the body ECU 304. In Step S405, by subtracting the mass detected in Step S402 from the mass detected in Step S404, a mass increased in the cargo compartment 15 in the current delivery is calculated. The mass increased in the cargo compartment 15 in the current delivery, which is calculated at this time, is stored in a storage unit (not illustrated) by the body ECU 304. When luggage has been carried away, the mass may have a negative value.

When the mass increased in the cargo compartment 15 in the current delivery is calculated and stored in the storage unit, the body ECU 304 transmits a signal to the control unit 352 of the data communication device 350 such that the increased mass (hereinafter also referred to as a comparison mass) is transmitted to the central server 400. The control unit 352 receives the comparison mass via the body ECU 304 and the control unit 352 transmits the comparison mass to the central server 400 via the communication unit 351. The comparison mass is transmitted in correlation with identification information of a request user. When the communication unit 401 of the central server 400 receives the comparison mass, the control unit 402 of the central server 400 stores the comparison mass in a storage unit which is not illustrated.

Figure 23:
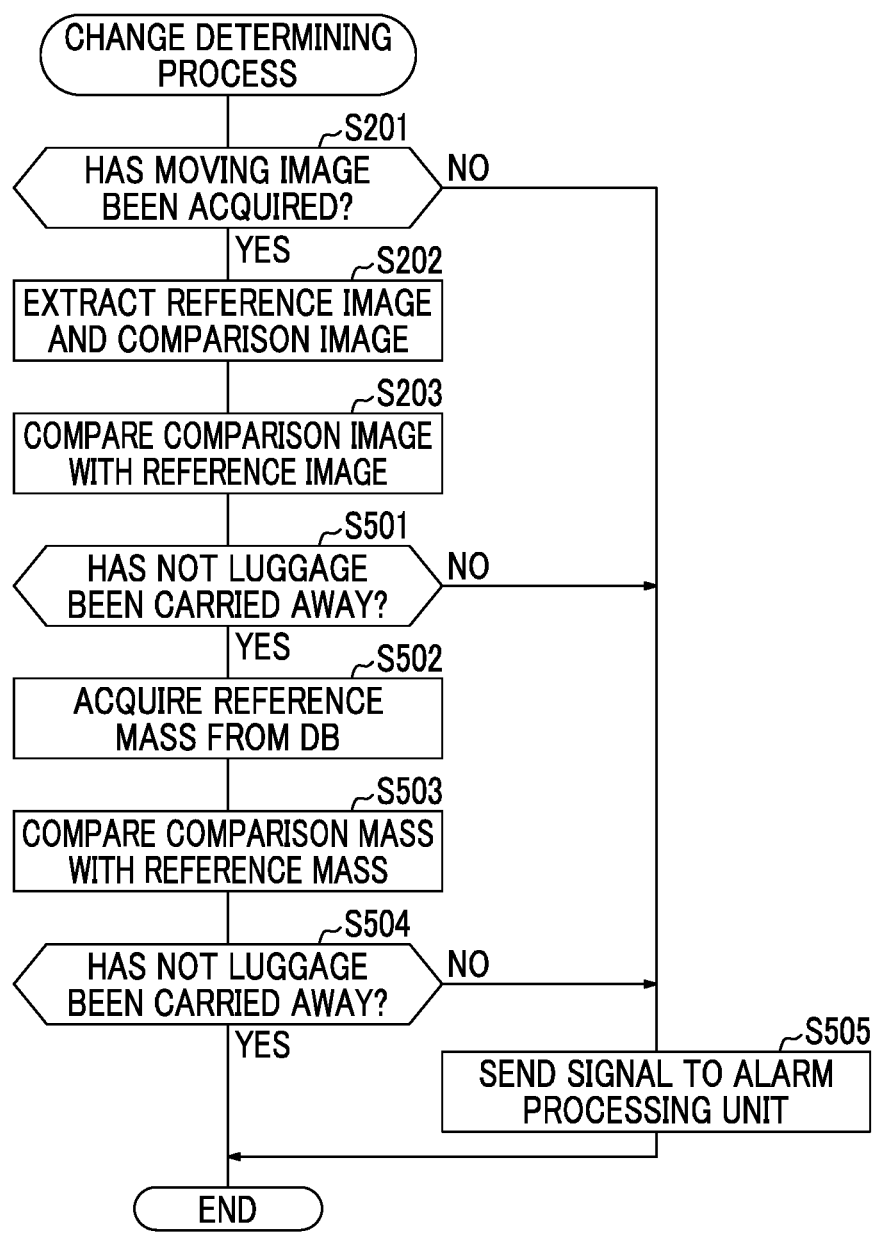
FIG. 23 is a flowchart illustrating a flow of a change determining process.

A change determining process according to this embodiment will be described now. FIG. 23 is a flowchart illustrating a flow of the change determining process. Steps in which the same processes as in the flowchart illustrated in FIG. 14 will be referred to by the same reference signs and description thereof will not be repeated. The change determining process according to this embodiment is performed by the central server 400.

In the flowchart illustrated in FIG. 23, Step S501 is performed after Step S203. In Step S501, it is determined whether luggage has been carried away. When the determination result of Step S501 is negative, the process flow transitions to Step S505. On the other hand, when the determination result of Step S501 is positive, the change determination processing unit 4023 acquires data of the mass of luggage from the delivery management server 500 in Step S502. The control unit 402 of the central server 400 transmits a signal for requesting data of the mass of luggage stored in the delivery management DB 503 to the delivery management server 500 via the communication unit 401. This signal is transmitted in correlation with identification information of a request user. The control unit 502 of the delivery management server 500 having received the signal via the communication unit 501 extracts the corresponding mass of luggage (hereinafter also referred to as a reference mass) from the delivery management DB 503 and transmits the extracted mass of luggage to the central server 400. When the communication unit 401 of the central server 400 receives the reference mass, the control unit 402 of the central server 400 stores the reference mass in a storage unit which is not illustrated.

In Step S503, the change determination processing unit 4023 compares the reference mass with the comparison mass and determines that luggage has not been carried away when there is no difference between the reference mass and the comparison mass or when there is a difference therebetween but the difference is within an error range. In Step S504, the change determination processing unit 4023 determines whether luggage has been carried away. When the determination result of Step S504 is positive, it is determined that luggage has not been carried away based on the comparison result in image and the comparison result in mass and thus the process flow ends. On the other hand, when the determination result of Step S504 is negative, the process flow transitions to Step S505. In Step S505, since it is determined that luggage has been carried away based on the comparison result in image and the comparison result in mass, a carrying-away signal is transmitted to the alarm processing unit 4024 and the process flow ends. The alarm processing unit 4024 having received the carrying-away signal from the change determination processing unit 4023 performs a predetermined notification process.

In the flowchart illustrated in FIG. 23, when it is determined that luggage has been carried away based on at least one of the comparison result in image and the comparison result in mass, the alarm processing unit 4024 performs a predetermined notification process. However, when it is determined that luggage has been carried away based on both of the comparison result in image and the comparison result in mass, the alarm processing unit 4024 may perform a predetermined notification process. That is, when the comparison result in image and the comparison result in mass are equal, the result may be employed for determining whether luggage has been carried away. On the other hand, when both results are different, it may be determined that luggage has been carried away for the purpose of security.

According to this embodiment, since whether luggage has been carried away based on images and masses as described above, it is possible to curb erroneous determination.

What is claimed is:

1. A server, comprising:
    a processor configured to:
        communicate with a communication device mounted on a vehicle,
        obtain a first image and a second image from the communication device, and
        determine whether a luggage has been carried away from an inside of a predetermined area of the vehicle based on a result of comparison between the first image and the second image, wherein
    the predetermined area is used as a delivery place of the luggage,
    the first image is an image captured by an imaging device at a previous locking-associated time associated with a time at which the vehicle is locked previously,
    the second image is an image captured by an imaging device at a current locking-associated time associated with a time at which the vehicle is locked currently,
    the processor is configured not to determine whether the luggage has been carried away from the inside of the predetermined area of the vehicle in a case where the vehicle is unlocked in response to a request from a request user terminal, and
    the request user terminal is a terminal used by a user who receives the luggage delivered to the predetermined area, and the request user terminal is configured to request a locking/unlocking device mounted in the vehicle to lock and unlock the vehicle.

2. The server according to claim 1, wherein
    the processor is configured to
        send an inquiry to a request user terminal about whether the luggage has been taken out from the predetermined area when the vehicle is unlocked in response to a request from the request user terminal and
        not to determine whether the luggage has been carried away from the inside of the predetermined area of the vehicle based on the first image in a case where the request user terminal returns a response indicating that the luggage has been taken out in response to the inquiry.

3. The server according to claim 2, wherein
    the processor is configured to perform a predetermined notification process to the request user terminal when the processor determines that the luggage has been carried away from the predetermined area.

4. The server according to claim 1, wherein
    the previous unlocking-associated time and the current unlocking-associated time are respective times at which a detection unit detects that the predetermined area is opened.

5. The server according to claim 1, wherein
    the previous unlocking-associated time and the current unlocking-associated time are respective times at which a detection unit detects that the predetermined area is closed.

6. A server, comprising:
    a processor configured to:
        communicate with a communication device mounted on a vehicle,
        obtain a first image and a second image from the communication device, and
        determine whether a luggage has been carried away from an inside of a predetermined area of the vehicle based on a result of comparison between the first image and the second image, wherein
    the predetermined area is used as a delivery place of the luggage,
    the first image is an image captured by an imaging device at a locking-associated time associated with a time at which the vehicle is locked,
    the second image is an image captured by the imaging device at an unlocking-associated time associated with a time at which the vehicle is unlocked,
    the processor is configured not to determine whether the luggage has been carried away from the inside of the predetermined area of the vehicle in a case where the vehicle is unlocked in response to a request from a request user terminal, and
    the request user terminal is a terminal used by a user who receives the luggage delivered to the predetermined area, and the request user terminal is configured to request a locking/unlocking device mounted in the vehicle to lock and unlock the vehicle.

7. The server according to claim 6, wherein
    the previous unlocking-associated time and the current unlocking-associated time are respective times at which a detection unit detects that the predetermined area is opened.

8. The server according to claim 6, wherein
    the previous unlocking-associated time and the current unlocking-associated time are respective times at which a detection unit detects that the predetermined area is closed.

* * * * *